United States Patent
Patel et al.

(10) Patent No.: US 7,496,329 B2
(45) Date of Patent: *Feb. 24, 2009

(54) RF ID TAG READER UTILIZING A SCANNING ANTENNA SYSTEM AND METHOD

(75) Inventors: Jay Patel, Columbia, MD (US); Om Gupta, Dayton, MD (US); Shuguan Chen, Ellicott City, MD (US); James S. Finn, Washington, DC (US)

(73) Assignee: Paratek Microwave, Inc., Columbia, MD (US)

( * ) Notice: Subject to any disclaimer, the term of this patent is extended or adjusted under 35 U.S.C. 154(b) by 947 days.

This patent is subject to a terminal disclaimer.

(21) Appl. No.: 10/716,147

(22) Filed: May 17, 2004

(65) Prior Publication Data

US 2004/0266481 A1    Dec. 30, 2004

Related U.S. Application Data

(63) Continuation-in-part of application No. 10/388,788, filed on Mar. 14, 2003, now abandoned.

(60) Provisional application No. 60/365,383, filed on Mar. 18, 2002.

(51) Int. Cl.
    *H04B 5/00*  (2006.01)
    *H04Q 5/22*  (2006.01)

(52) U.S. Cl. .................................. 455/41.2; 340/10.52

(58) Field of Classification Search .................... 455/39, 455/41.1, 41.2, 88, 562.1; 342/359, 360, 342/361, 368, 371, 372, 450, 463; 340/10.1, 340/10.42, 10.5, 10.51, 10.52

See application file for complete search history.

(56) References Cited

U.S. PATENT DOCUMENTS

| | | | |
|---|---|---|---|
| 5,312,790 A | 5/1994 | Sengupta et al. | 501/137 |
| 5,427,988 A | 6/1995 | Sengupta et al. | 501/137 |
| 5,486,491 A | 1/1996 | Sengupta et al. | 501/137 |
| 5,593,495 A | 1/1997 | Masuda et al. | 117/4 |
| 5,635,433 A | 6/1997 | Sengupta | 501/137 |
| 5,635,434 A | 6/1997 | Sengupta | 501/138 |
| 5,640,042 A | 6/1997 | Koscica et al. | 257/595 |
| 5,693,429 A | 12/1997 | Sengupat et al. | 428/699 |
| 5,694,134 A | 12/1997 | Barnes | 343/700 |
| 5,766,697 A | 6/1998 | Sengupta et al. | 427/585 |
| 5,830,591 A | 11/1998 | Sengupta et al. | 428/701 |
| 5,846,893 A | 12/1998 | Sengupta et al. | 501/137 |
| 5,886,867 A | 3/1999 | Chivukula et al. | 361/311 |

(Continued)

*Primary Examiner*—Nguyen Vo
(74) *Attorney, Agent, or Firm*—James S. Finn

(57) ABSTRACT

An RF ID tag system and method that utilizes an RF ID tag and an RF ID tag reader which incorporates a dynamically reconfigurable wireless antenna and/or an array antenna and/or a switched polarization antenna. The dynamically reconfigurable wireless antenna embodiment comprises at least one multi-layered RF module, said at least one RF module further comprising at least one RF connector for receipt of at least one RF signal and at least one layer of tunable dielectric material and one layer of metal fabricated into said RF module; an RF motherboard for acceptance of RF signals and distribution of the transmit energy to said RF module at the appropriate phases to generate a beam in the commanded direction and width; and a controller for determining the correct voltage signal to send to said at least one multi-layered RF module.

30 Claims, 18 Drawing Sheets

U.S. PATENT DOCUMENTS

| | | | |
|---|---|---|---|
| 5,990,766 A | 11/1999 | Zhang et al. | 333/205 |
| 6,074,971 A | 6/2000 | Chiu et al. | 501/139 |
| 6,377,142 B1 | 4/2002 | Chiu et al. | 333/238 |
| 6,377,217 B1 | 4/2002 | Zhu et al. | 343/700 |
| 6,377,440 B1 | 4/2002 | Zhu et al. | 361/311 |
| 6,404,614 B1 | 6/2002 | Zhu et al. | 361/277 |
| 6,492,883 B2 | 12/2002 | Liang et al. | 333/132 |
| 6,514,895 B1 | 2/2003 | Chiu et al. | 501/137 |
| 6,525,630 B1 | 2/2003 | Zhu et al. | 333/205 |
| 6,531,936 B1 | 3/2003 | Chiu et al. | 333/164 |
| 6,535,076 B2 | 3/2003 | Partridge et al. | 333/17.1 |
| 6,538,603 B1 | 3/2003 | Chen et al. | 342/372 |
| 6,556,102 B1 | 4/2003 | Sengupta et al. | 333/161 |
| 6,590,468 B2 | 7/2003 | du Toit et al. | 333/17.3 |
| 6,597,265 B2 | 7/2003 | Liang et al. | 333/204 |
| 2005/0113138 A1* | 5/2005 | Mendolia et al. | 455/558 |
| 2005/0212676 A1* | 9/2005 | Steinberg | 340/572.8 |
| 2007/0252687 A1* | 11/2007 | Hansen et al. | 340/505 |

* cited by examiner

RF ID TAG READER UTILIZING A SCANNING ANTENNA SYSTEM AND METHOD

CROSS-REFERENCE TO RELATED APPLICATION

This application is a continuation in part of patent application Ser. No. 10/388,788, entitled, "WIRELESS LOCAL AREA NETWORK AND ANTENNA USED THEREIN" "filed Mar. 14, 2003, now abandoned by Hersey et al., which claimed the benefit of priority under 35 U.S.C Section 119 from U.S. Provisional Application Ser. No. 60/365,383, filed Mar. 18, 2002.

BACKGROUND OF THE INVENTION

1. Field of the Invention

This invention relates generally to position determination and tracking systems. More specifically, this invention relates to radio frequency identification (RFID) tag systems, methods and readers. Still more specifically, the present invention relates to RFID tags and tag readers that utilize a scanning antenna or an electronically steerable passive array antenna for significant system improvements.

2. Background Art

Many product-related and service-related industries entail the use and/or sale of large numbers of useful items. In such industries, it may be advantageous to have the ability to monitor the items that are located within a particular range. For example, within a particular store, it may be desirable to determine the presence and position of inventory items located on the shelf, and that are otherwise located in the store.

A device known as an RFID "tag" may be affixed to each item that is to be monitored. The presence of a tag, and therefore the presence of the item to which the tag is affixed, may be checked and monitored by devices known as "readers." A reader may monitor the existence and location of the items having tags affixed thereto through one or more wired or wireless interrogations. Typically, each tag has a unique identification number that the reader uses to identify the particular tag and item.

Currently, available tags and readers have many disadvantages. For instance, currently available tags are relatively expensive. Because large numbers of items may need to be monitored, many tags may be required to track the items. Hence, the cost of each individual tag needs to be minimized. Furthermore, currently available tags consume large amounts of power. These inefficient power schemes also lead to reduced ranges over which readers may communicate with tags in a wireless fashion. Still further, currently available readers and tags use inefficient interrogation protocols. These inefficient protocols slow the rate at which a large number of tags may be interrogated.

As the antennas in readers are typically omni-directional or, at best, manually directed, positioning information can only be obtained if the tags can be sure of their position and can relay the information to the reader. However, if the tags are moved or are moving or do not possess their position information, their angular position cannot be determined. Thus, there is a strong need in the art for an RF ID tag system and method that can determine the angular position of the tag relative to the reader.

Further, because the antennas are omni-directional and are constrained by FCC power limitations and other power constraints as mentioned above, the range is very severely limited. Hence, there is a strong need in the industry to provide an antenna that can allow for scanning and directionality for significant signal gain and overcoming multipath problems. Since omni-directional antennas always read all tags at all times, this limits the number of tags a reader can handle. With a directional beam, you can have more total tags in the area since only the tags that are being illuminated by the beam will be read.

Thus, in summary, what is needed is a tag that is inexpensive, small, and has reduced power requirements, can provide tag directional information and that can operate across longer ranges, so that greater numbers of tags may be interrogated at faster rates and with position information.

SUMMARY OF THE INVENTION

The present invention includes an RF ID tag system and method including an RF ID tag and RF ID tag reader that utilizes a dynamically reconfigurable wireless antenna that comprises at least one RF module (which can be multilayered), said at least one RF module further comprising at least one RF connector for receipt of at least one RF signal and at least one layer of tunable dielectric material and one layer of metal fabricated into said RF module; an RF motherboard for acceptance of RF signals and distribution of the transmit energy to said RF module at the appropriate phases to generate a beam in the commanded direction and width; and a controller for determining the correct signal (for example, but not limited to, voltage signal) to send to said at least one RF module. The scanning antenna operation is in any one, all or part of the following frequencies: the 2.4 GHz band; the 5.1 to 5.8 GHz band; the 860-960 MHz band; or the 433 MHz band.

The invention also encompasses a method of tracking an object, person or thing, said method comprising the steps of associating an RF ID tag with said object, person or thing; providing an RF ID tag reader with a scanning antenna for transmitting information to, and receiving information from, said RF ID tag, said RF ID tag may contain information about said object, person or thing; wherein said scanning antenna comprises at least one multi-layered RF module, said at least one RF module further comprising at least one RF connection for receipt of at least one RF signal and at least one tunable or switchable device; an RF motherboard for acceptance of RF signals and distribution of the transmit energy to said RF module at the appropriate phases to generate a beam in the commanded direction and width; and a controller for determining the correct voltage signal to send to said at least one multi-layered RF module.

Further, this invention discloses and claims an RF tag reader wherein said reader comprises a microcontroller associated with a transceiver; a scanning antenna interfaced with said microcontroller and transceiver, said antenna comprising at least one multi-layered RF module, said at least one RF module further comprising at least one RF connector for receipt of at least one RF signal and at least one layer of tunable dielectric material and one layer of metal; an RF motherboard for acceptance of RF signals and distribution of the transmit energy to said RF module at the appropriate phases to generate a beam in the commanded direction and width; and a controller for determining the correct voltage signal to send to said at least one multi-layered RF module.

In a further embodiment the present invention discloses and claims an RF ID card reader wherein said card reader comprises RF ID circuitry to generate an RF ID signal; a transceiver in communication with said RF ID circuitry; and an array antenna associated with said transceiver for scanning an area for at least one tag and establishing communication with at least one tag and wherein said array antenna further comprises a radiating antenna element; at least one parasitic antenna element; at least one voltage-tunable capacitor connected to said at least one parasitic antenna element; and a controller for applying a voltage to each voltage-tunable capacitor to change the capacitance of each voltage-tunable capacitor and thus control the directions of maximum radiation beams and minimum radiation beams of a radio signal emitted from said radiating antenna element and said at least one parasitic antenna element.

Disclosed also herein is a position determination system, wherein at least one RF ID tag is associated with an object, person or thing and at least one RF ID tag reader establishes communication with said at least one RF ID tag. The at least one RF ID tag reader includes at least two electronically steerable scanning antennas and determines the relative location of said at least one RF ID tag by triangulating the angular information between said at least one RF ID tag and said at least two electronically steerable scanning antennas which are associated with said at least one RF ID tag reader.

The method of position determination is accomplished by associating at least one RF ID tag with anything from which position information or tracking information is desired from, such as any object, person or thing. Then communication is established between at least one RF ID tag reader and said at least one RF ID tag. In a first embodiment, at least one RF ID tag reader includes at least two electronically steerable scanning antennas. At this point one can determine the location of said at least one RF ID tag relative to said at least one RF ID tag reader by triangulating the angular information between said at least one RF ID tag and said at least two electronically steerable scanning antennas associated with said at least one RF ID tag reader.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DESCRIPTION OF THE PRFFERRFD EMBODIMENT

The present invention serves as an internal or external antenna for a RF ID TAG reader application as well as a position determination and tracking system and method. The antenna interfaces with an RFID reader that can be used in a RF ID tag system for significant performance advantages. The antennas described herein can operate in any one, all or part of the following frequencies: the 2.4 GHz Industrial, Scientific and Medical (ISM) band; the 5.1 to 5.8 GHz band; the 860-960 MHz band; or the 433 MHz band; although it is understood that they can operate in other bands as well. A software driver functions to control the antenna azimuth scan angle to maximize the received wireless signal from a tag associated with a reader. In a first embodiment, the key performance requirement to steer a beam with 6 dBi of gain throughout a 360° azimuth, or any segmentation of 360 degrees, scan is enabled Existing RF ID TAG RFADERS currently use fixed antennas. Most often, omni-directional antennas are used, which are typically integrated into the RF ID TAG RFADER card or exist as an integral monopole antenna. External high gain antennas exist; however, these have a fixed beam that the user must manipulate by hand. The present invention requires no user intervention and ensures maximum performance.

The basic components of the present invention include a RF ID tag and an RF ID reader, with the scanning antenna of the present invention associated with the reader and functioning in several different embodiments as described below.

Figure 1A:
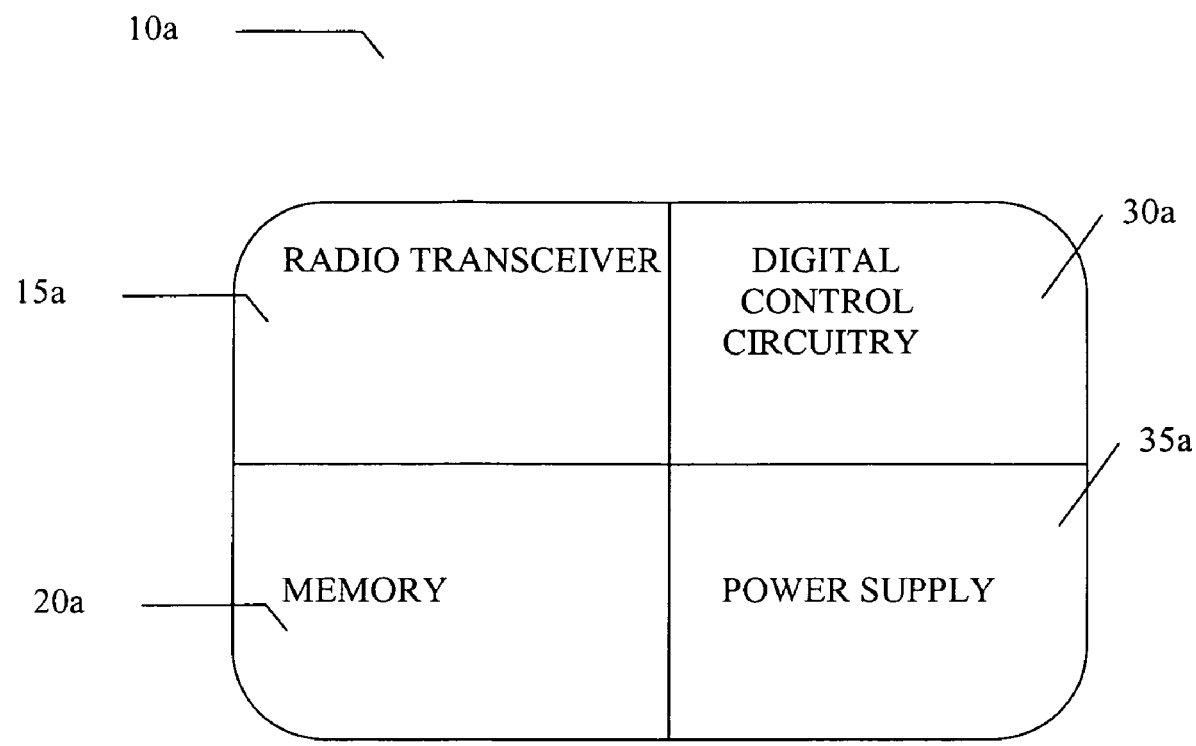
FIG. 1a is a block diagram of the basic sections of an RF ID tag.
Figure 1B:
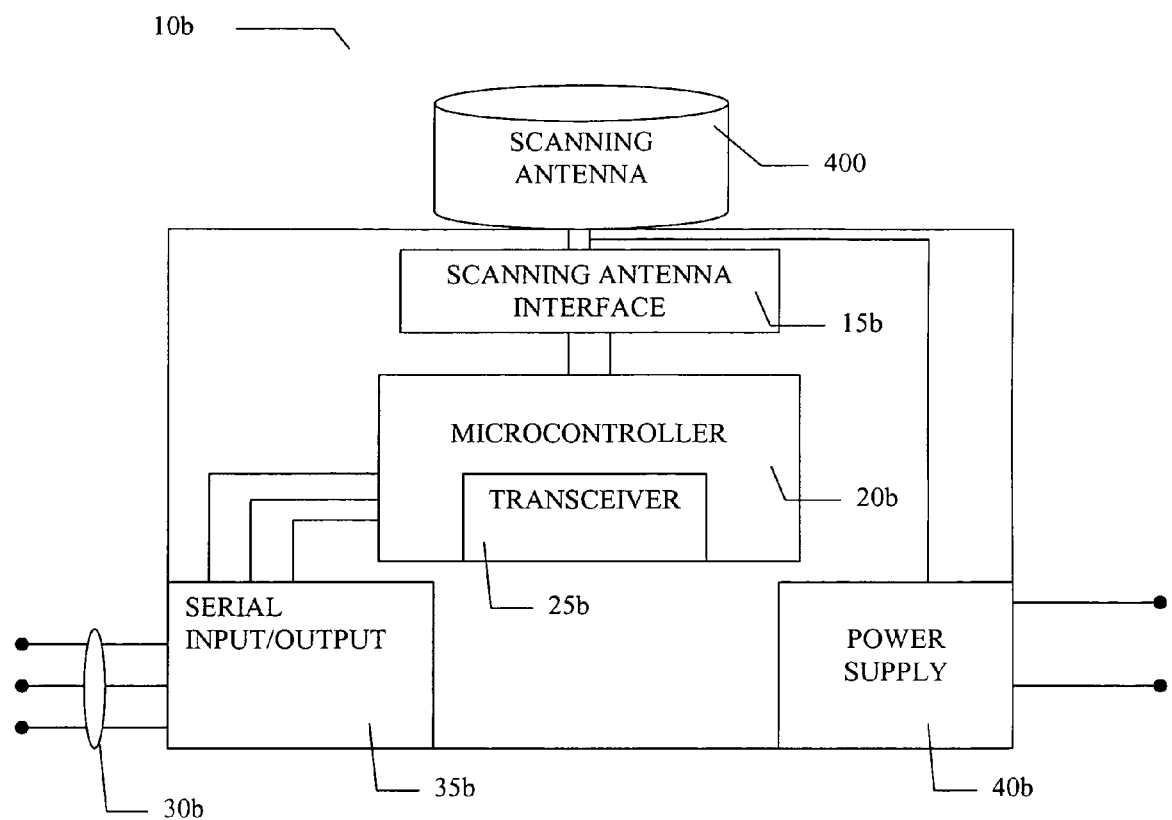
FIG. 1b is a block diagram of the basic sections of an RF ID tag reader.

Referring now the figures, FIG. 1a shows a block diagram of a typical RF ID tag or transponder circuit. Such RF ID tag systems are commercially available from Disys Inc. in Toronto, Canada as their 90 Series RF ID tags and from Hughes ID Corporation in Mission Viejo, Calif. Dysis publishes a "90 Series RF/ID System Applications Manual for CRM-90 Readers and 90 Series Tags, the details of which are hereby incorporated by reference. RF ID tag reader/writer circuits suitable for use as interface with the scanning antenna are also commercially available from these two sources. RF ID tags are also currently commercially available from Atmel Corporation of Colorado Springs, Colo. and Eurosil, a Division of Daimler Benz located in Munich. Reader/writer systems are also available from Indala, a division of Motorola located in San Jose, and as two integrated circuit sets (one transceiver and one digital section) are commercially available from another division of Daimler Benz called AEG Telefunken. The details of these commercially available RF ID tags and RF ID tag readers are hereby incorporated by reference. A block diagram of a typical circuit that may be used for the RF ID tag reader 10b is shown in FIG. 1b.

An RF ID tag, 10a shown in FIG. 1a, is a small circuit which includes a radio transceiver 15a which is powered by power derived from rectification of incoming RF signals, the process of deriving suitable power from the incoming RF being performed by power supply section 35a. The RF ID tag also has on-board nonvolatile memory 20a for storing data such as an identifier code which identifies the type of person, object of things that the tag is attached to and a serial number identifying the particular tag. The memory is nonvolatile and may be both written and read by RF communication to the chip in the preferred embodiment, but in alternative embodiments, the memory may be fixed and unalterable such as ROM or even hardwired connections. Typically, the nonvolatile memory is of the ROM, EEPROM or anti-fuse variety. Several U.S. patents naming inventor Bruce Rosener and assigned to Unisys Corporation and Instant Circuit exist describing the structure of nonvolatile antifuze memory in an RF ID tag with no independent power source. These patents are: U.S. Pat. Nos. 4,442,507; 5,296,722; 5,407,851; 4,796,074; and 5,095,362. Further, recent advancements in RF Tag technology are described in U.S. Pat. No. 5,550,547 entitled, "Multiple item radio frequency tag identification protocol"; U.S. Pat. No. 5,995,006 entitled, "Radio Frequency Tag"; and U.S. Pat. No. 5,883,575 entitled, "RF-tags utilizing thin film bulk wave acoustic resonators". The details of these patents are hereby incorporated by reference and it is understood that future advancements in RF ID tag technology can be utilized in the novel scanning antenna feature in the reader of the present invention.

The RF ID tag also includes digital control circuitry 30a which controls switching of the antenna connection, whether the tag is sending or receiving, and reading and writing the memory section. Typical instruction sets for the more sophisticated RF ID tags currently available include commands to Read Word n, Write Word n, Read Delayed and Turn Off such that the RF ID tag does not respond to interrogations.

The function of the RF ID tag is to receive an excitation signal from the reader, modify it in some way which is indicative of data identifying the particular tag that did the modification, thereby identifying the particular item to which the tag is attached, and then transmitting back to the reader. In the absence of stimulus from the reader, the tag is dormant and will not transmit data of its own volition.

Typically, the low frequency RF ID tags are very small and are affixed to a substrate upon which a coiled conductive trace serving as an antenna is formed by integrated circuit or printed circuit technology. The digital control circuitry also keeps the tag "locked" so that it cannot alter data in the memory or read and transmit data from the memory until the digital circuitry detects reception of the unlock sequence. The RF ID reader/writer unit knows the unlock sequence for the RF ID tags to be unlocked for interrogation or writing data thereto, and transmits that sequence plus interrogation or other commands to the RF ID tags.

FIG 1b illustrates a first embodiment of the reader as used in the present invention. However, it is understood that the novel scanning antenna can be used with any reader that can benefit from the use of a scanning antenna as described below. FIG. 1b depicts a block diagram of a typical RF ID tag reader 10b from the class of devices that can be used as the RF ID tag reader 10b of the present invention (hereafter referred to as the reader). The reader 10b has a range of from a few millimeters to several meters and more depending upon size of the RF ID tag (hereafter may also be referred to as a transponder), the directionality of the beam of the scanning antenna, the operating frequency, and whether the transponder is a passive or active type. The reader 10b can contain a microcontroller 20b for controlling reader functionality and programming and is connected to a scanning antenna 400 via interface 15b. A transceiver 25b can be associated with said microcontroller for generation and reception of RF signals to be passed to scanning antenna 400 via interface 15b Power is provided by power supply 40b and a serial input/out 35b is provided to provide information to microcontroller 20b via serial communications link 30b. This enables external programming and functionality control of microcontroller 20b.

Transponders of a passive variety are those discussed above which generate power to operate the circuits therein from an excitation signal transmitted from the reader. There is another class of transponder however of an active class which some form of energy source independent of the reader such as a small primary cell such as a lithium battery.

Figure 1C:
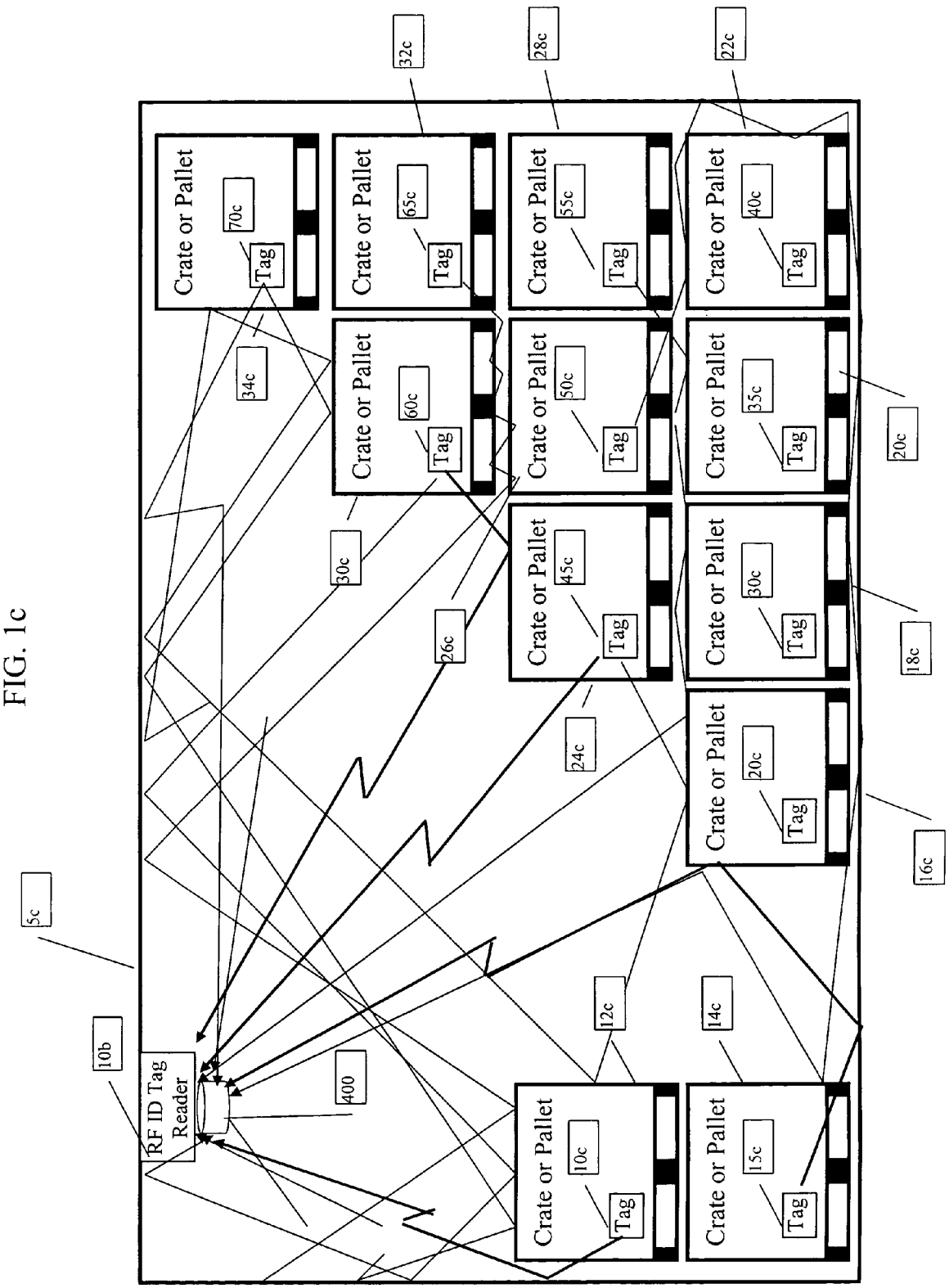
FIG. 1c is a depiction of the method of tracking an object, further depicting the directionality capability and the scanning capability of the scanning antenna of the present invention as well a multipath environment which is improved by the directional ability of the present invention.

FIG. 1c is a depiction of the method of tracking an object and further depicting the directionality capability and the scanning capability of the scanning antenna 400 of the present invention; as well a multipath environment which is improved by the directional ability of the present invention. A warehouse 5c is represented in FIG. 1c with an RF ID tag system implemented therein. Crates 12c, 14c, 16c, 18c, 20c, 22c, 24c, 26c, 28c, 30c, 32c and 34c are shown as typical crates might be stored in a typical warehouse 5c. In a typical metal warehouse, a great amount of multipath is created while communicating with the tags associated with a large plurality of items to be tracked. In this case, tags 10c, 15c, 20c, 30c, 35c, 40c, 45c, 50c, 55c, 60c, 65c and 70c are associated with crates 12c, 14c, 16c, 18c, 20c, 22c, 24c, 26c, 28c, 30c, 32c and 34c respectively. Because scanning antenna 400 is associated with reader 10b, the reader can scan narrow beam widths for tag transmissions and can transmit to the tags in narrow beam widths. This greatly diminishes the effects of multipath, improves range, decreases power requirements, improves data rate and overall provides for a much improved RF ID tag tracking system. The method used in this embodiment includes the steps of associating an RF ID tag with said object, person or thing (a crate in the embodiment of FIG. 1c); providing an RF ID tag reader 10b with a scanning antenna 400 for transmitting information to, and receiving information from, said RF ID tag(s) 10c, 15c, 20c, 30c, 35c, 40c, 45c, 50c, 55c, 60c, 65c and 70c, said RF ID tag containing information about crates 12c, 14c, 16c, 18c, 20c, 22c, 24c, 26c, 28c, 30c, 32c and 34c; wherein said scanning antenna comprises at least one RF module (which can be multi-layered), said at least one RF module further comprising at least one RF connection for receipt of at least one RF signal and at least one tunable or switchable device; an RF motherboard for acceptance of RF signals and distribution of the transmit energy to said RF module at the appropriate phases to generate a beam in the commanded direction and width; and a controller for determining the correct voltage signal to send to said at least one multi-layered RF module. Further, and as described in more detail below, the aforementioned RF ID tag system can be implemented wherein said antenna is an array antenna, and wherein said array antenna comprises a radiating antenna element; at least one parasitic antenna element; at least one voltage-tunable capacitor connected to said at least one parasitic antenna element; and a controller for applying a voltage to each voltage-tunable capacitor to change the capacitance of each voltage-tunable capacitor and thus control the directions of maximum radiation beams and minimum radiation beams of a radio signal emitted from said radiating antenna element and said at least one parasitic antenna element.

Figure 1D:
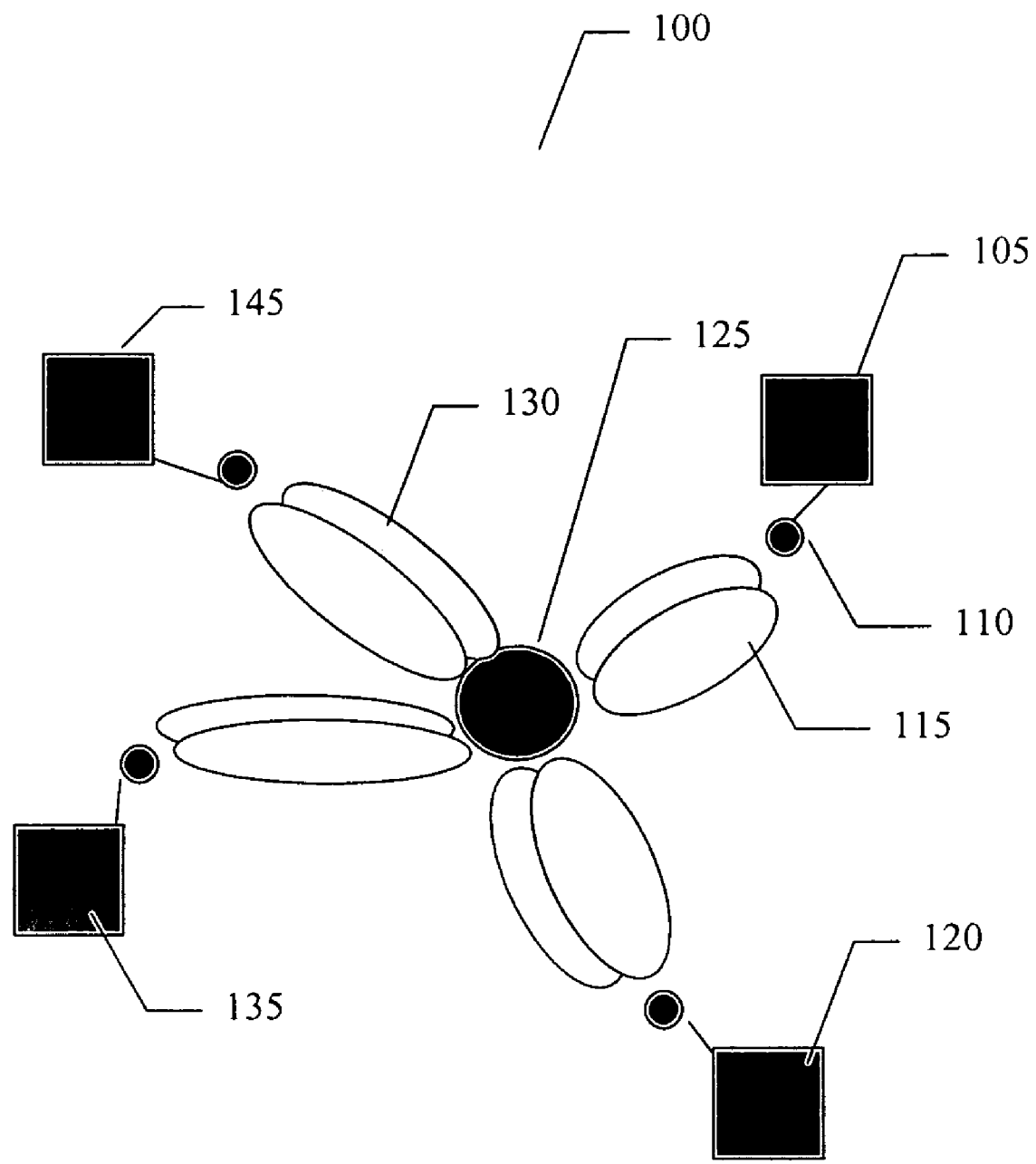
FIG. 1d is an illustration of an example RF ID tag environment with a single carrier version of the present invention.

The present invention can be implemented in several networking embodiments which benefit from the scanning antenna 400 incorporated herein. FIG. 1d depicts a single carrier version wherein network 100 has reader 125 and tags 105, 120, 135 and 145; such as a tag associated with anything for which tracking information is desired. In FIG. 1d this is depicted as 110 and is understood that it can be anything from pallets in a warehouse to people in an amusement park. In this single carrier solution, multiple channels are possible using the tunable technology of the present invention. In this example, the multiple channels 115 and 130 allow for communication with many tags and, if desired communication at high data rates with the tags of at least 11 Mbps bandwidth using only 22 MHz of spectrum and in a narrow transmission beam for greater range or data throughput and less multipath interference.

Figure 2:
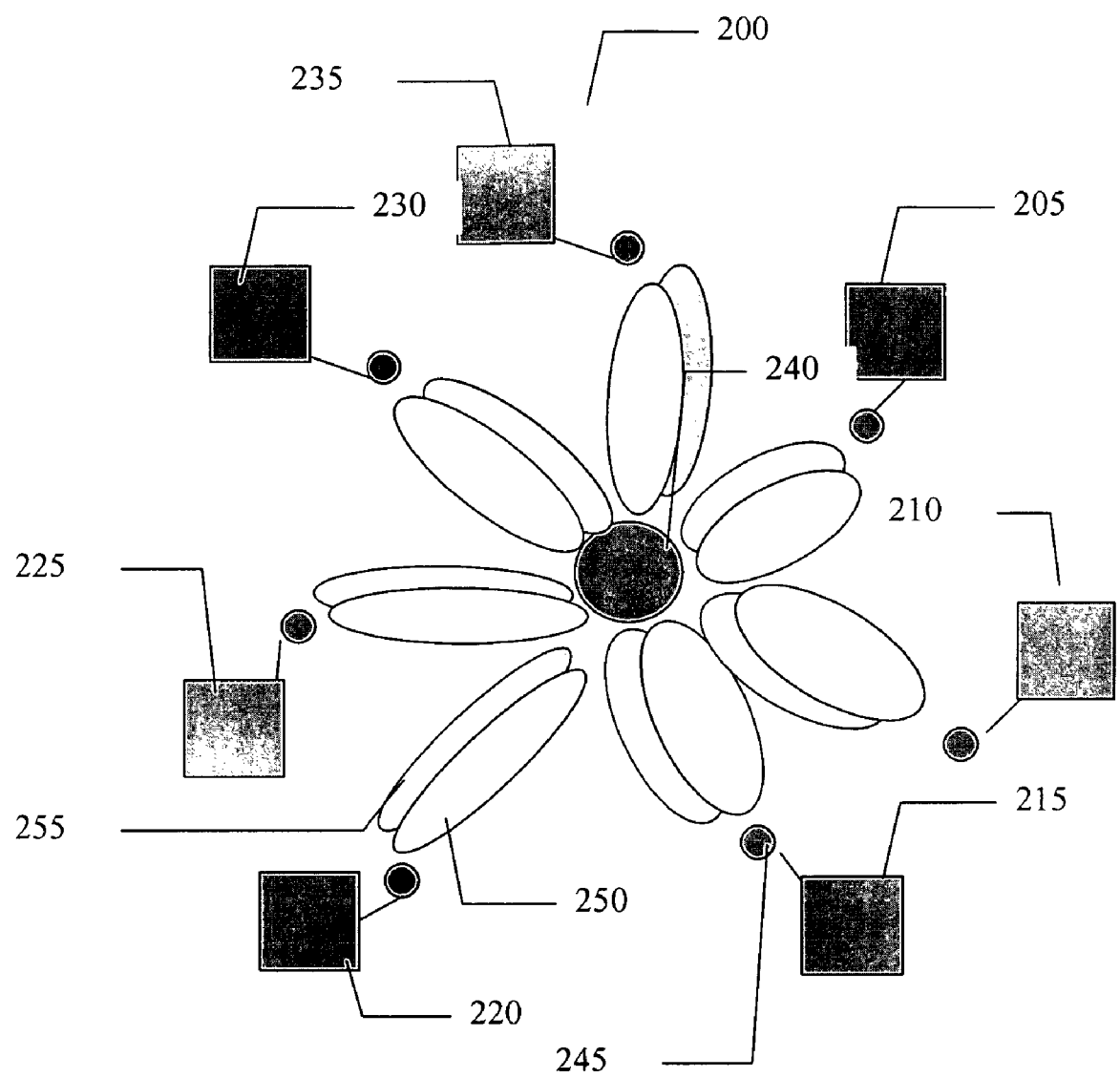
FIG. 2 is an illustration of an example RF ID tag environment with the multi-beam embodiment of the present invention.

FIG. 2 depicts the multi-beam embodiment wherein RF ID tag system 200 has RF ID tag reader 240 and tags 205-235 which can be associated with items to be tracked 245. In this multi-carrier solution multiple beams 250 and 255 are used with one beam for each channel. In this embodiment, at least 22 Mbps is achieved with 44 MHz of spectrum, which enables tracking and position determination of many tags.

Figure 3:
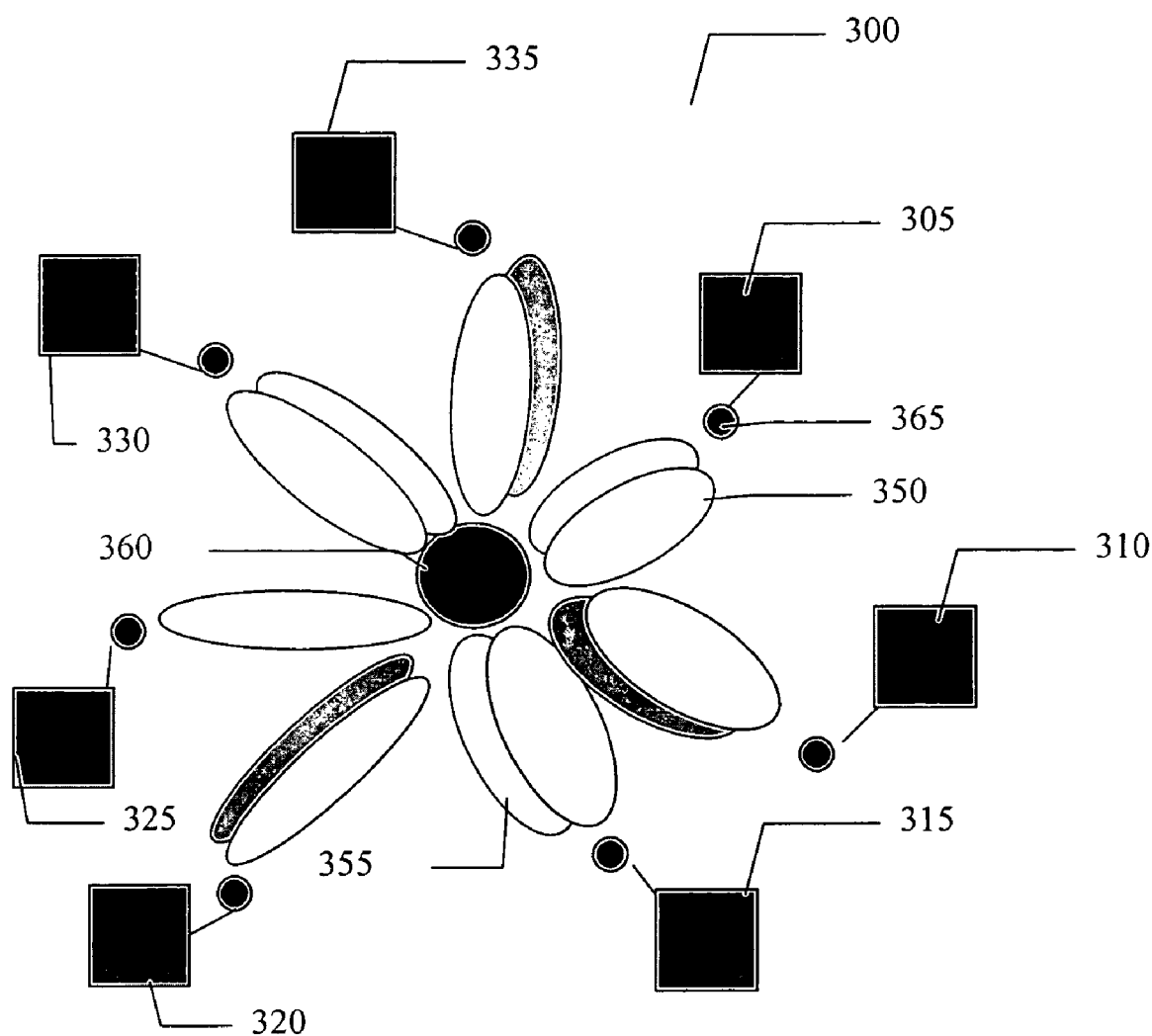
FIG. 3 is an illustration of an example RF ID environment with the multiple beams, frequency reuse embodiment of the present invention.

FIG. 3 depicts the multiple beams, frequency reuse embodiment of the present invention. Herein RF ID tag system 300 has RF ID tag reader 360 and tags 305-335 for tracking and position determination. In this multiple-beam, frequency reuse embodiment individual channels 350 and 355 for all beams are used. An item to be tracked associated with tag 305 is illustrated at 365. It is understood that all tags will have a reception antenna and in this embodiment at least 22 Mbps using 22 Mhz is achieved and a large number of tags can be tracked and positioned determined. Tags are well known in this art and it is understood that many different type of tags can be used with the present invention including the tag described above in FIG. 1a.

As will be shown in the figures to follow, the scanning antenna used with the reader 10b of the preferred embodiment of the present invention may contain the following subassemblies in antenna 400, with exploded view shown as 500: RF Modules 515, RF Motherboard 545, controller connector 915 (with connector screws 910 and 920), base 410, radome 405, external RF cables [MMCX to transceiver card] (not shown), external control cables (not shown), external power supply connector 905 and a software driver. The external RF and control cables connect the antenna 400 to the RF ID tag reader 10b via interface 15b.

The power supply cable connects between an AC outlet and the antenna 400; although, it is understood that any power supply can be utilized in the present invention. Further, power can be supplied by reader 10b, through interface 15b and by power supply 40b. Mating MMCX jacks (or any similar RF connectors now known or later developed) 415 and 420, DB-25 female, and DC power jack connectors 905 are located on the side of the base 410 and can facilitate connection with interface 15b. The DC power jack 905 and DB-25 connector 915 are right angle connectors integral to the controller Printed Circuit Board (PCB), with the mating portions 415, 420 exposed through the base 410, again to facilitate interconnection with interface 15b. Once inside the housing, the RF signals are transferred to the RF motherboard 545 via flexible coaxial cables (not shown) to a surface mount interface 535.

The controller determines the correct voltage signals to send to the motherboard 545, as requested by the received software command and the current internal temperature sensed at the phase shift modules. These voltages are sent across a ribbon cable (not shown) to the switches and phase shifters located on the motherboard 545. The controller also provides feedback to the reader circuitry via interface 15b so that the software can determine if the antenna is present or not. The controller mounts rigidly to the inside bottom of the base 410 with its main connector 915 exposed.

The motherboard distributes the RF signals to the nine RF modules 515 via RF connectors 510 and 520. The dual RF input allows for either single or dual polarization which can be either linear or circular. Simply horizontal or vertical polarization is also enabled. The signal from the main connectors 595 and 535 are divided three ways, each to a phase shifter and then an SP3T switch. The outputs of the switch terminate in nine places, one for each RF module. This permits any of three consecutive RF modules 515 to be active and properly phased at any time. The motherboard (not shown) mounts rigidly to the top side of the base 410, which is stiffened to ensure that the phase shift and power divider modules will not shatter under expected environmental conditions. Cutouts 575 exist in the top of the base for connector pins and cable access features.

The RF modules consist of a multilayer antenna for broad bandwidth. They are connected to the motherboard via a flex microstrip circuit. The modules are mounted perpendicular to the motherboard, and are secured to the base via vertical triangular posts 525.

The radome 405 fits over the product and is fused to the base 410, both at the bottom of the radome 405 and top of the base 410 intersection, and at the base posts to the inside top of the radome 405.

Subassembly Descriptions

RF Modules 515

Figure 8:
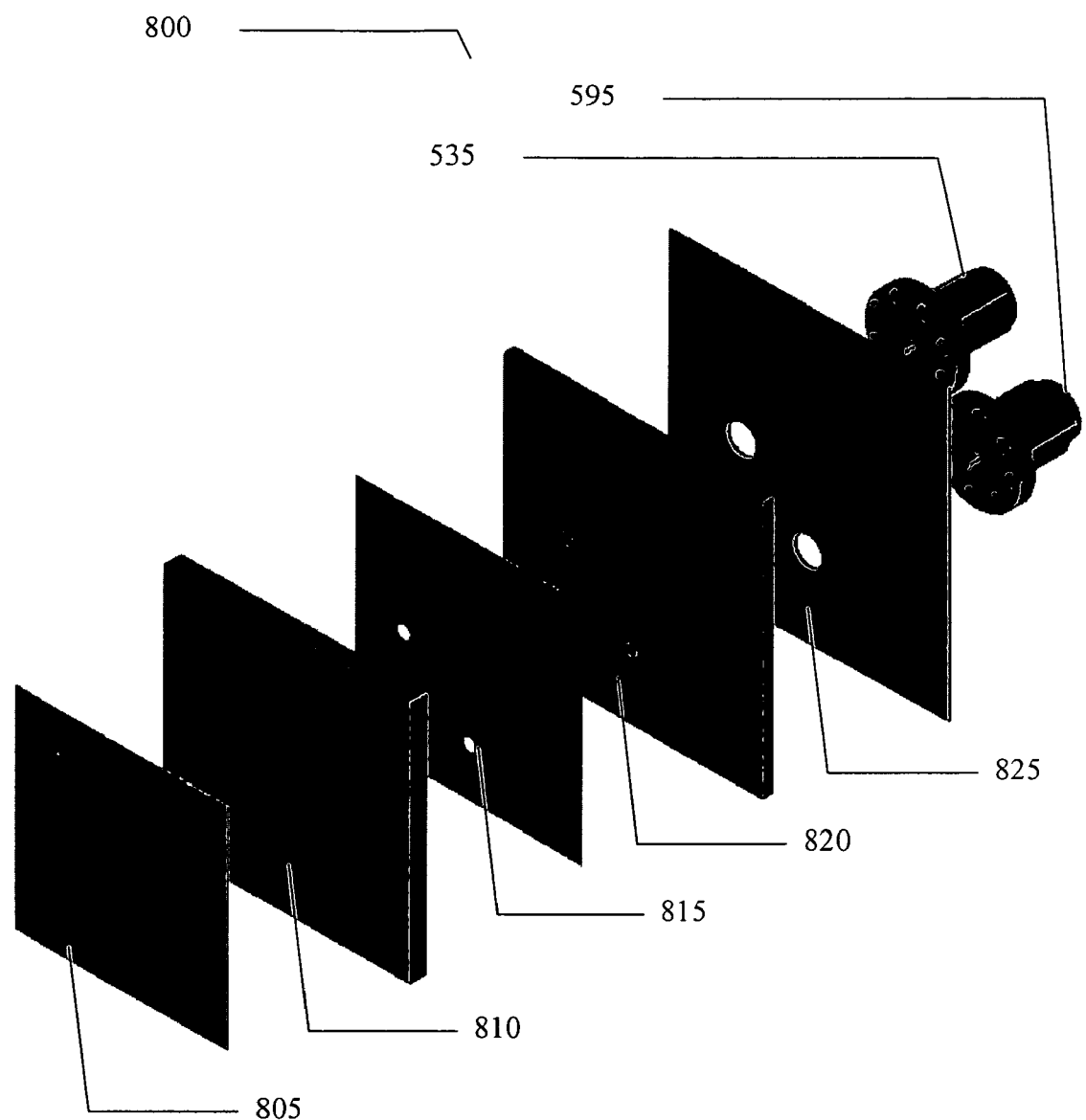
FIG. 8 is a more detailed exploded view of the RF Module construction of the RF ID tag reader antenna of the present invention.

In the preferred embodiment of the present invention, nine RF modules 515 are required for the assembly of each antenna. As shown in FIG. 8, 800, each module is a multilayer bonded structure consisting of alternating metal 805, 815, 825 and dielectric 810, 820 layers. Although, nine RF modules 515 are depicted in this preferred embodiment, it is understood that one skilled in the art can vary the number of RF modules according to performance parameters and design choice—such as the number of tags to be tracked and the distance anticipated from the reader to the tags.

The outer layer 825 of the subassembly 515 can be a stamped brass element about 1.4"±0.002" square. This brass element is bonded to a block of dielectric 1.5"±0.01" square 820. A target material can be polystyrene if cost is a consideration, where the requirements are a dielectric constant between 2.6 and 3.0. Once established in the design, the dielectric constant should be maintained at frequency within 2%. The loss tangent of this dielectric should not exceed 0.002 at 2.5 GHz. The above assembly is bonded to an inner metal layer of stamped copper element 815 plated with immersion nickel-gold and is about 1.4"±0.002" square. The above assembly is then bonded to another block of identical dielectric 1.7"×1.8"±0.01" square 805. This subassembly is completed with a bonded flex circuit described below in the interconnection section.

RF Motherboard 545

The RF motherboard 545 consists of a 9-sided shaped microwave 4-layer PCB. Although it is understood that the shape of the motherboard and the number of sides can be modified to alternate shapes and sides without falling outside the scope of the present invention. In the present invention, the inscribed circular dimension is 4.800±0.005". Rogers RO4003 material with ½ ounce copper plating is used for each of the three 0.020" dielectric layers. This stack up permits a microstrip top layer and an internal stripline layer. All copper traces can be protected with immersion nickel-gold plating. Alternate substrate materials can be considered for cost reduction, but should have a dielectric constant between 2.2 and 3.5, and a loss tangent not exceeding 0.003 at 2.5 GHz.

The motherboard functions to accept two signals from the MMCX connectors 415, 420 (although MMCX connectors are used, it is understood than any similar RF connectors now known or later developed can also be used) from individual coaxial cables and properly distribute the transmit energy to the appropriate elements at the appropriate phases to generate a beam in the commanded direction. The coaxial cables have a snap-on surface mount connection to the motherboard. Each of these cables feed a 3-way power divider module, described below. The output of each power divider connects to a 90°-phase shifter module, also described below. The output of each phase shifter feeds a SP3T switch. In the preferred embodiment, a Hittite HMC241QS16 SP4T MMIC switch was selected, although a multitude of other switches can be utilized. Three of the switched outputs connect go to the module connection landings, in alternating threes; that is, switch #1 connects to modules 1, 4, and 7, etc. It is the alternating nature that requires the motherboard to be multi-layer, to permit crossover connections in the stripline layer. Thus, one skilled in the art can utilize design choice regarding the number of layers and switch to module connections. At the output of each switched line is a 10 V DC blocking capacitor; and, at each end of the phase shifter is a 100 V DC blocking capacitor. These fixed capacitors should have a minimum Q of 200 at frequency, and are nominally 100 pF.

Three-Way Divider

The three-way divider can be a 1"×1"×0.020" 96% Alumina SMD part. Copper traces are on the top side and a mostly solid copper ground plane is on the bottom side, except for a few relief features at the port interfaces. All copper is protected with immersion nickel-gold plating. There are no internal vias on this preferred embodiment of the present invention. Provisions can be made to enable the SMD nature of this inherently microstrip four-port device.

90° Phase Shifter

The 90° phase shifter is a 1"×1"×0.020" 96% Alumina SMD part. Copper traces are on the top side and a mostly solid copper ground plane is on the bottom side, except for a few relief features at the port interfaces. All copper is protected with immersion nickel-gold plating. There are two internal vias to ground on the device. Two thin film SMD Parascan varactors are SMT mounted to the top side of this device. Some provisions can be made to enable the SMD nature of this inherently microstrip two-port device. Parascan is a trademarked tunable dielectric material developed by Paratek Microwave, Inc., the assignee of the present invention. Tunable dielectric materials are the materials whose permittivity (more commonly called dielectric constant) can be varied by varying the strength of an electric field to which the materials are subjected or immersed. Examples of such materials can be found in U.S. Pat. Nos. 5,312,790, 5,427,988, 5,486,491, 5,693,429 and 6,514,895. These materials show low dielectric loss and high tunability. Tunability is defined as the fractional change in the dielectric constant with applied voltage. The patents above are incorporated into the present application by reference in their entirety.

Controller

The controller consists of a 3"×5"×0.031" 4-layer FR-4 PCB. It has SMD parts on the top side only, as is mounted to the bottom of the base 410. The controller has two right angle PCB-mount external connectors 415, 420 that can be accessed through the base 410. A DB-25 female connector 915 is used for the command and a DC power jack 905 is used to receive the DC power. It is, of course, understood that any connector can be used for command and power connection.

The controller contains a microprocessor and memory to receive commands and act on them. Based upon the command, the controller sends the proper TTL signals to the SP3T switches and the proper 10 to 50 V (6-bit resolution) signals to the phase shifters. To send these high voltage signals, a high voltage supply, regulator, and high voltage semiconductor signal distribution methods are used.

Base 410

The design choice for this preferred embodiment has a base formed from black Acrylonitrile Butadiene Styrene (ABS) and measures 6.5" round in diameter and 0.5" in main height. The bottom is solid to accommodate the controller board, and the side has one flat surface for the connectors. The top side at the 0.5" height is reinforced in thickness to achieve the rigidity to protect the Alumina modules; or, a thin 0.1" aluminum sheet could be used in addition at the top if needed.

Extending from the main top side level are nine vertical triangular posts 525 that make the overall height 3.0 inches, minus the thickness of the radome 405. This ensures that the radome 405 inside surface contacts the base posts. These posts 525 provide alignment and centering for the RF modules that connect to the RF motherboard via flex circuit sections. The RF modules are bonded in place to these posts. At the lower portion of base 410 are openings 555 and 590, whereat RF connectors 420 and 415 protrude.

Internal Interconnect and Distribution

The RF MMCX bulkhead jacks 415, 420 are connected to the RF motherboard 545 via thin coaxial cables. These cables are integral to the bulkhead connector 595 and 535 and have surface mount compatible snap-on features to attach to the motherboard. The controller sends its voltage signals to the RF motherboard 545 via a ribbon cable. Mating pins are provided on the controller and motherboard to accept the ribbon cable connectors.

The RF modules 515 are connected to the motherboard using a flex circuit. This flex circuit is made of 0.015" thick Kapton and has a matching footprint of the lower dielectric spacer (1.7"×1.8") and has an additional 0.375" extension that hangs off the 1.7" wide edge. The side of the circuit bonded at the dielectric spacer is completely copper except for a cross-shaped aperture, centered on the spacer. The exterior side of the circuit has two microstrip lines that cross the aperture and proceed down to the extension, plus the copper extends past the Kapton to allow a ribbon-type connection to the motherboards 545. At the bottom of the spacers 560 and throughout the extension there are coplanar ground pads around these lines. These ground pads 570 are connected to the reverse side ground through vias. These ground pads also extend slightly past the Kapton. Each module extension 530 can be laid on top of the motherboard and is soldered in place, both ground and main trace. All copper traces are protected by immersion nickel-gold plating.

End User Interconnect and Interfaces

The two coaxial cables carry the RF signals between the scanning antenna 400 and the reader 10b via interface 15b. One cable is used to carry each linear polarization, horizontal and vertical, for diversity. Both cables have an MMCX plug on one end and a connector which mates to the card on the other. This mating connector may be an MMCX, SMA, or a proprietary connector, depending upon the configuration of interface 15b.

The digital cable carries the command interface, and is a standard bi-directional IEEE-1284 parallel cable with male DB-25 connectors, and made in identical lengths as the RF cable. The DC power supply is a wall-mount transformer with integral cable that terminates in a DC power plug. This cable plugs into the antenna's DC power jack. However, as mentioned above the power supply 1115 of reader 10b can also power scanning antenna 400 vi interface 15b.

Radome Housing

A formed black ABS radome encloses the present invention and protects the internal components. It is understood that this housing is but one of any number of potential housings for the present invention. The outer diameter matches the base at 6.5", and the height aligns to the base vertical posts, for a part height of 2.5". Thus the antenna is 3.0" in total height. The radome has a nominal wall thickness of 0.063" and a 1° draft angle. The top of the radome is nominally 0.125" thick.

Fabrication

The controller can be screwed to the bottom of the base. The internal coaxial cable bulkheads are secured to the base. The copper ribbon extensions of the RF modules are soldered in a flat orientation to the RF motherboard. The snap-on ends of the coaxial cables are attached to the motherboard/module assembly, which is lowered in place between the base vertical posts. The RF modules are secured to the posts, perpendicular to the motherboard. The radome is fused to the base at its bottom and at the upper vertical posts.

Figure 4:
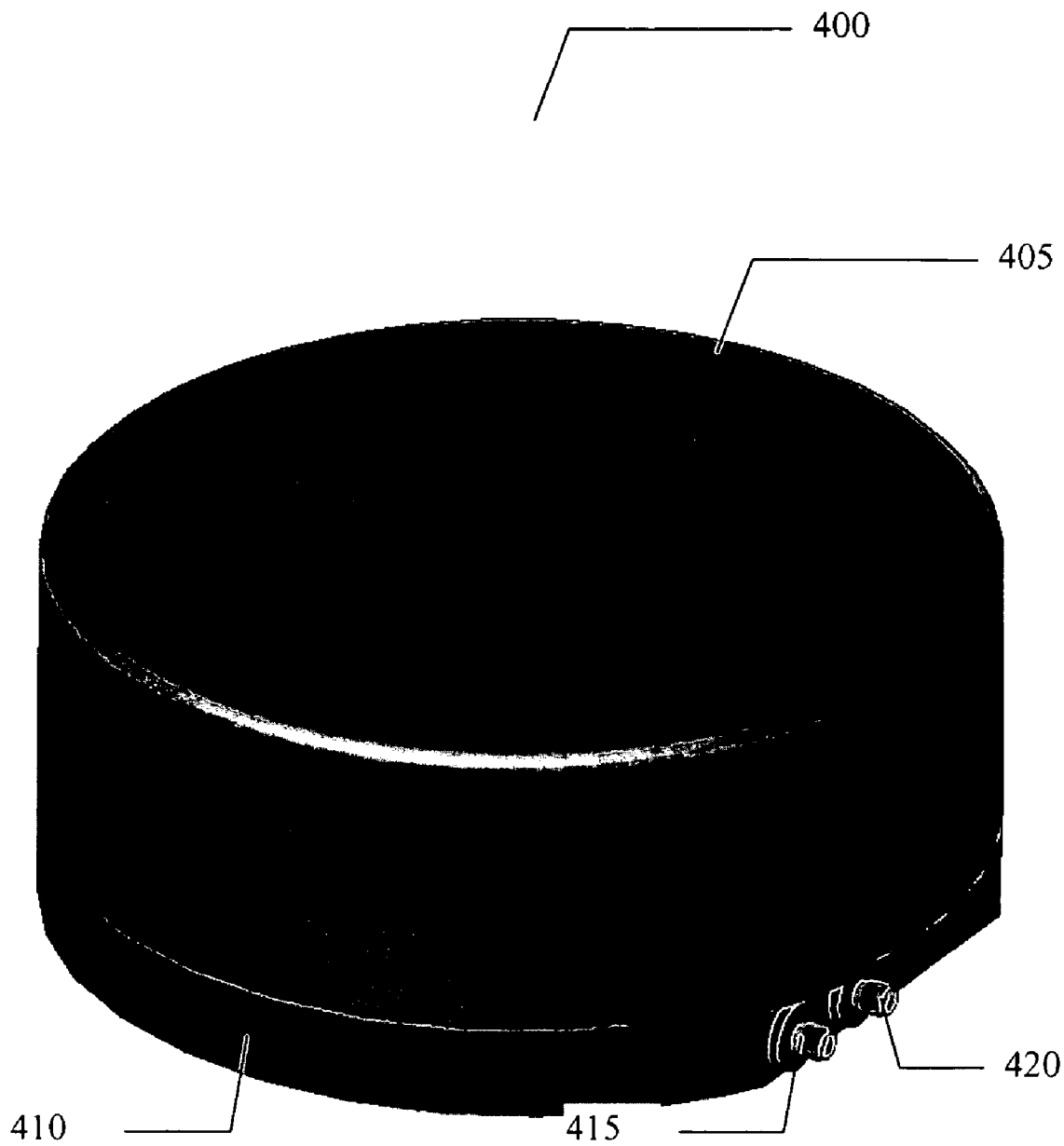
FIG. 4 depicts the RF ID tag reader antenna of the present invention.

For further elaboration of the fabrication of the present invention, FIGS. 4, 5, 6, 7 and 8 depict the present in invention with various levels of expansion. FIG. 4 depicts the scanning antenna 400 of the present invention in a completely fabricated view with the Radome 405 placed on top of base 410 with RF connectors 415 and 420 protruding from base 410.

Figure 5:
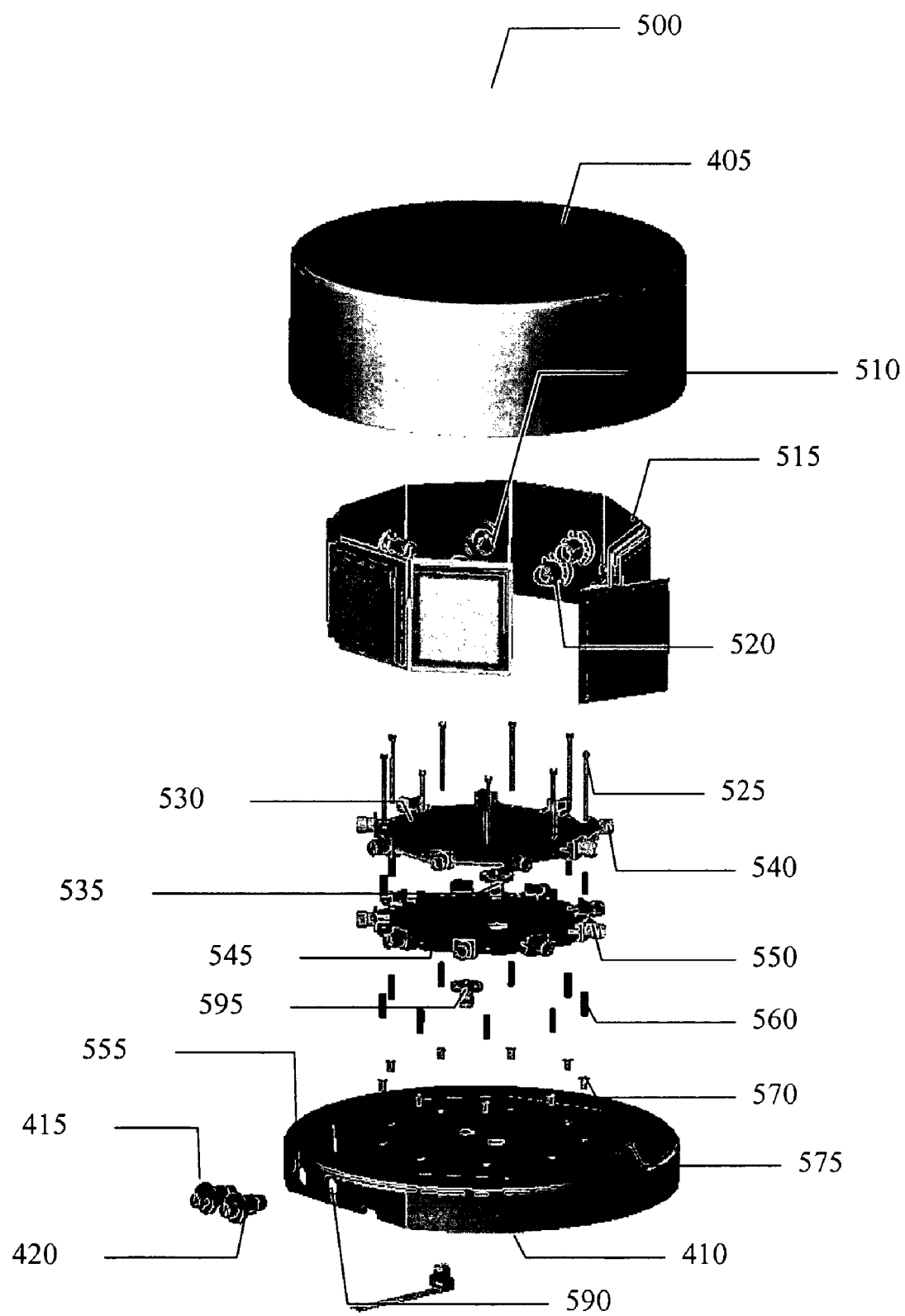
FIG. 5 is an exploded view of the RF ID tag antenna of the present invention.

FIG. 5 is an exploded view of the scanning antenna 400 of the present invention wherein all of the internal components of scanning antenna 400 can be seen. These include radome 405 and base 410 with representative RF module 515 and RF connectors 510 and 520 located within said RF module 515. Expansion module 530 also has RF connectors represented by 540. Posts for securing are depicted at 525 and spaces at 560. As described above, RF motherboard is shown at 545 immediately above base 410 and attached by screws 570. Main connectors 595 and 535 are shown connected to RF motherboard 545 and expansion module 530. Also connected to RF motherboard 545 is RF connector 550.

Figure 6:
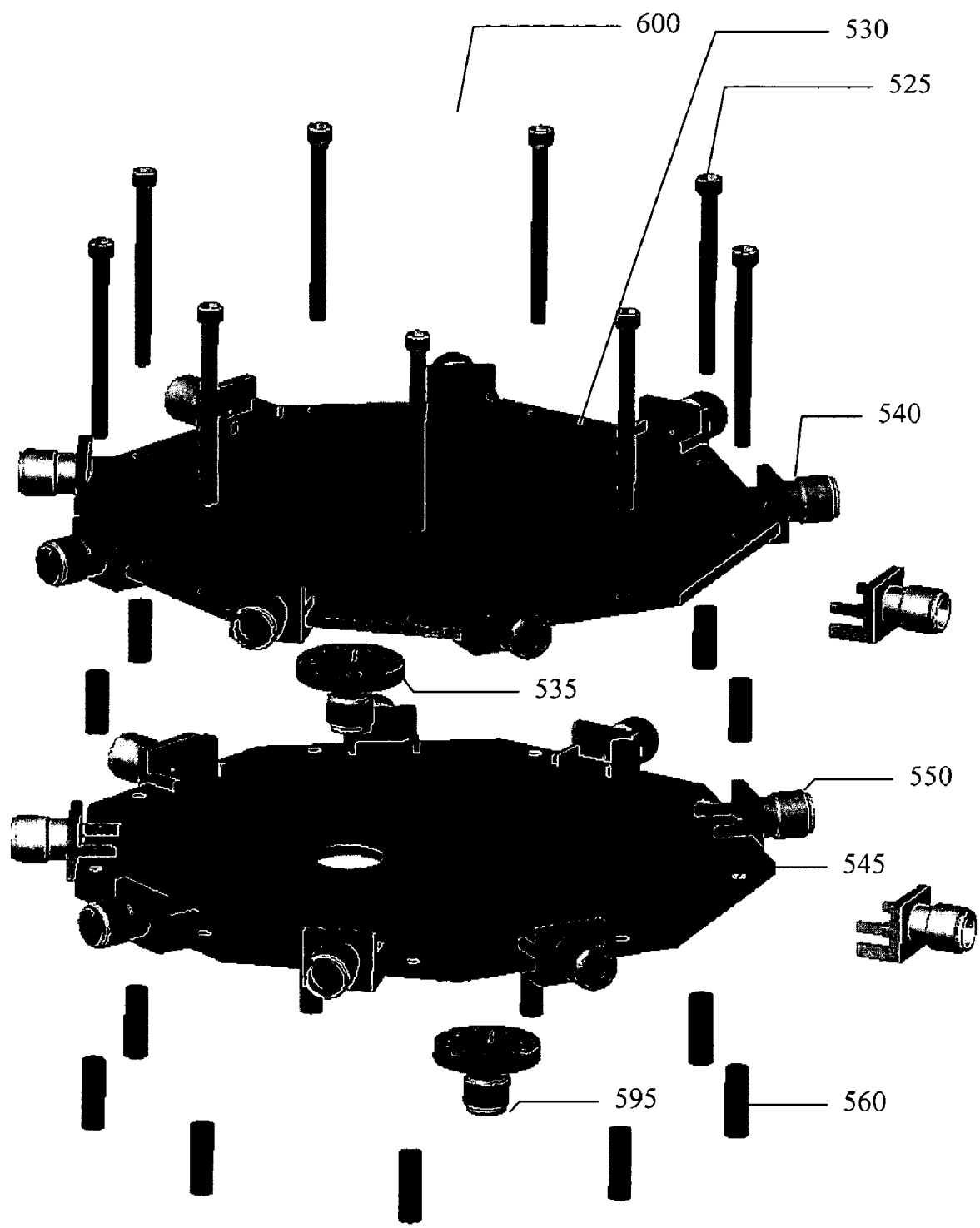
FIG. 6 is a more detailed exploded view of the RF Boards construction of the RFID tag antenna of the present invention.
Figure 7:
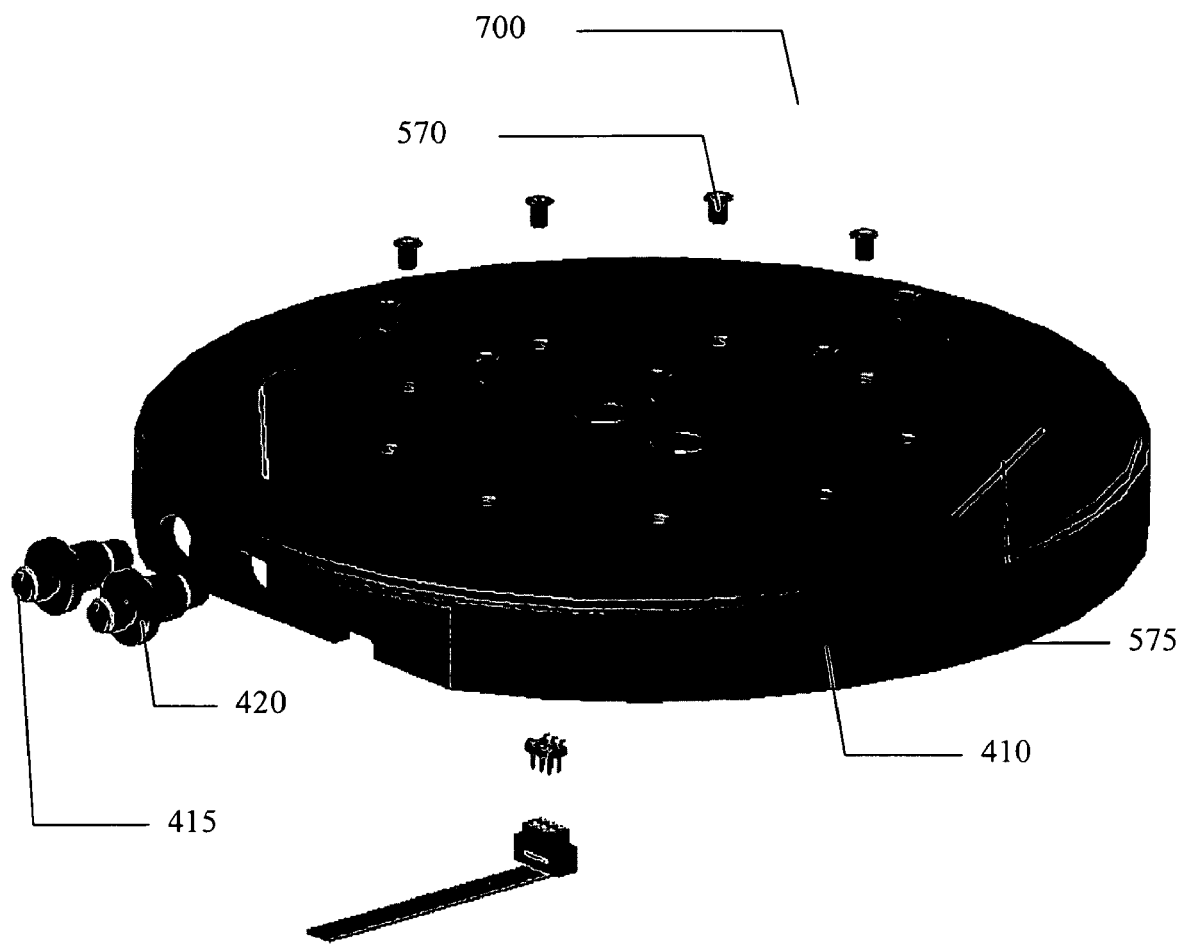
FIG. 7 is a more detailed exploded view of the base construction of the RF ID tag antenna of the present invention.

To more clearly depict the construction, FIG. 6 is a more detailed exploded view of the RF Boards construction of the scanning antenna of the present invention showing the construction of expansion module 515 and RF motherboard 545. Further, FIG. 7 is a more detailed exploded view of the base 410 construction of the scanning antenna of the present invention.

FIG. 8 is a more detailed exploded view of the RF Module construction of the scanning antenna of the present invention. This includes the placement of the dielectric material 810 and 820 adjacent to metal 805, 815 and 825. Although, the present depiction shows two dielectric layers and three metal layers, different layers can be used based on design choices and performance requirements.

Figure 9:
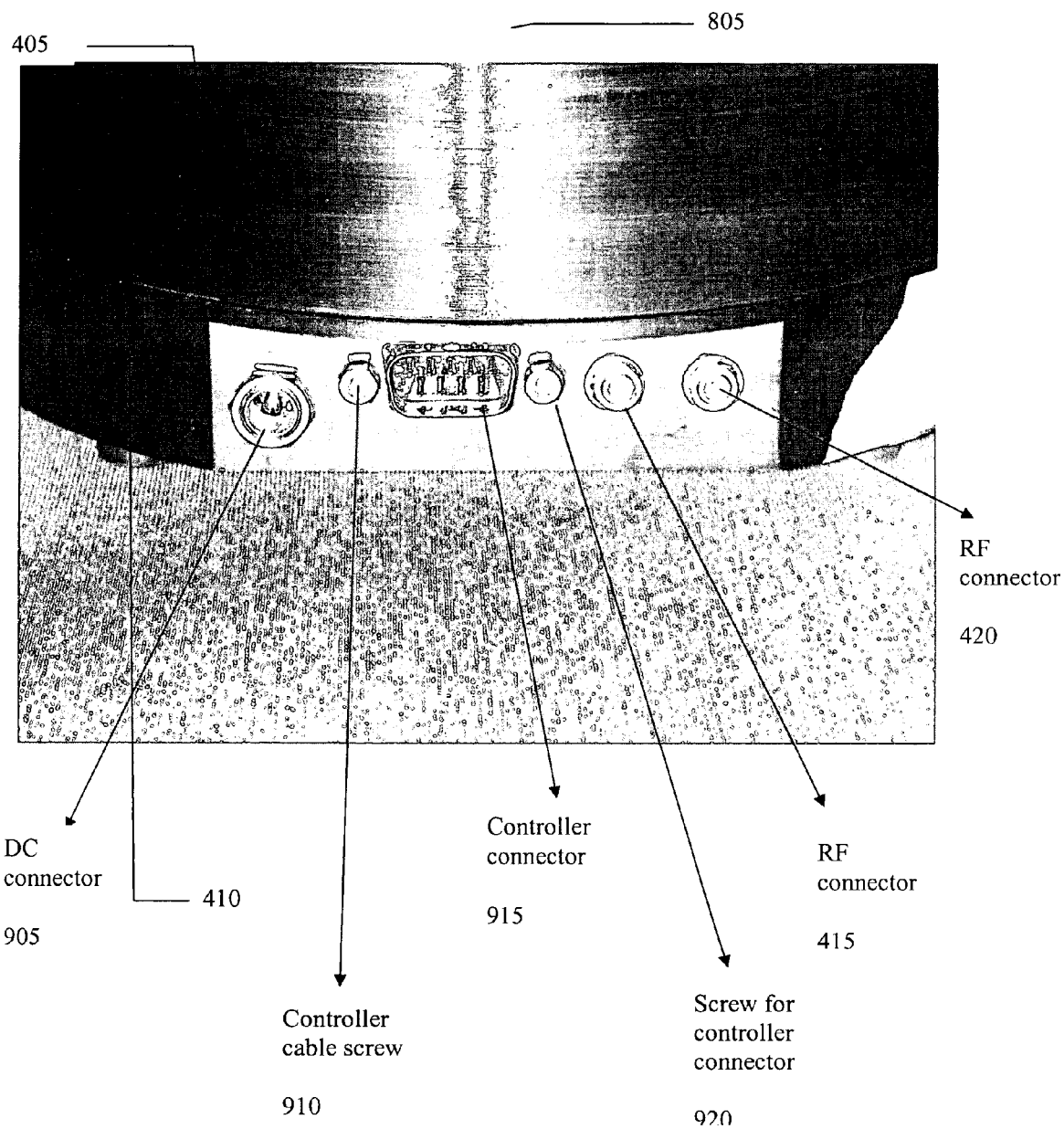
FIG. 9 is a depiction of a detailed view of the various inputs into the base of the RF ID tag reader antenna of the present invention.

FIG. 9 shows an actual representation of the invention herein described with base 410 allowing for RF connectors 420 and 415 and DC connector 905 and controller connector 915 with screws 910 and 920 for securing said controller connector.

Figure 10:
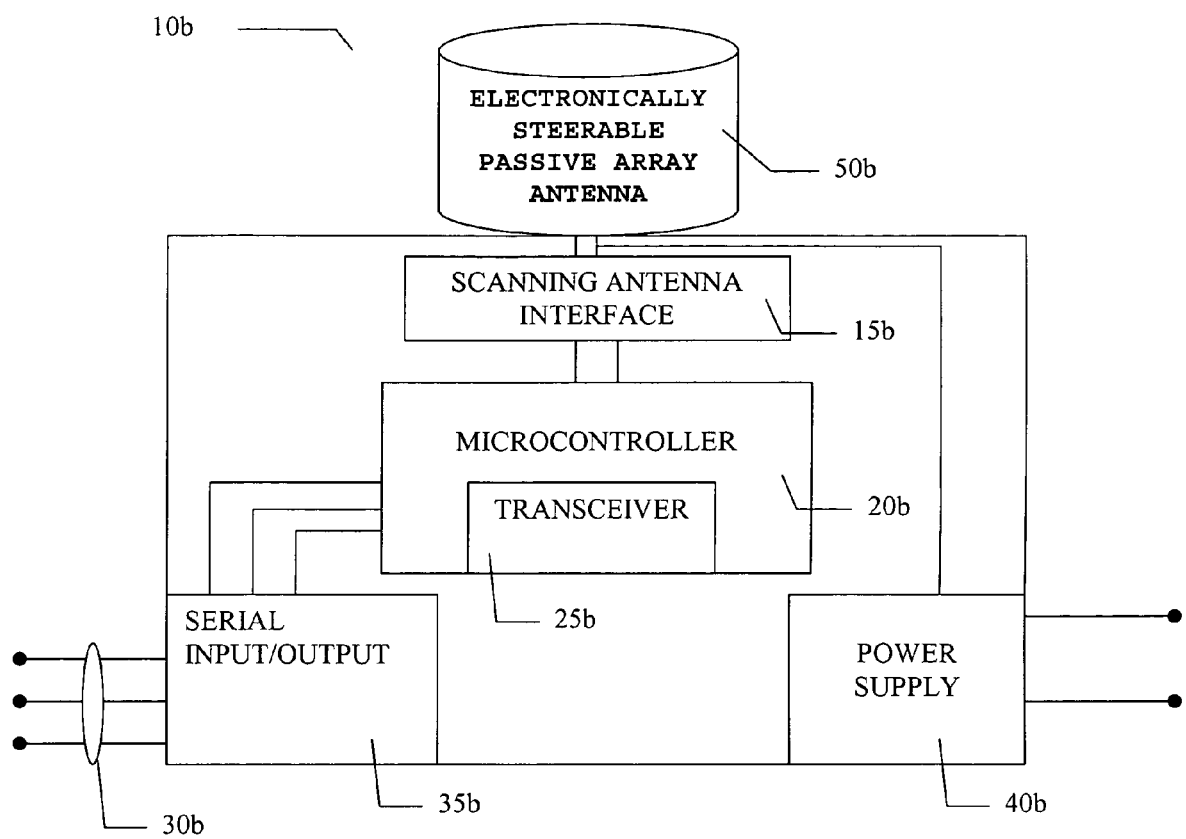
FIG. 10 is a block diagram of the basic sections of an RF ID tag reader with the electronically steerable passive array antenna incorporated therein.

FIG. 10 shows an alternate embodiment of the present invention which utilizes an electronically steerable passive array antenna in lieu of the scanning antenna set forth above. The electronically steerable passive array antenna is described in detail below and in a patent application filed by an inventor of the present invention on Aug. 14, 2003, and is entitled, "ELECTRONICALLY STEERABLE PASSIVE ARRAY ANTENNA", Ser. No. 10/413,317. FIG. 10 depicts a block diagram of a typical RF ID tag reader 10b as described above of the present invention. Again, the reader has a range of from a few millimeters to several meters and more depending upon size of the RF ID tag, the directionality of the beam of the scanning antenna, the operating frequency, and whether the transponder is a passive or active type. The reader 10b can contain a microcontroller 20b for controlling reader functionality and programming and in this embodiment is connected to an array antenna 90b, via interface 15b. As above, a transceiver 25b can be associated with said microcontroller 20b for generation and reception of RF signals to be passed to array antenna 50b via interface 15b As above, power is provided by power supply 40b and a serial input/out 35b is provided to provide information to microcontroller 20b via serial communications link 30b. This enables external programming and functionality control of microcontroller 20b.

Figure 11:
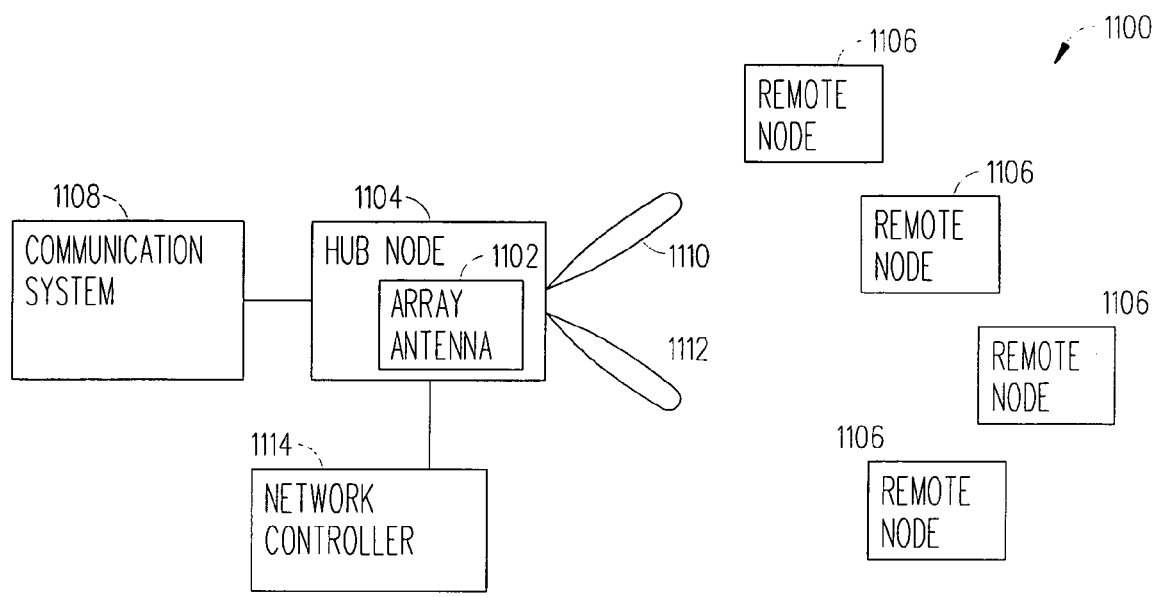
FIG. 11 is a block diagram of a wireless communications network capable of incorporating an array antenna in an RF ID tag system of the present invention.

Referring to the drawings which incorporate the electronically steerable passive array antenna embodiment of the present invention, FIG. 11 is a block diagram of a wireless communications network 1100 that can incorporate an array antenna 1102. Although the array antenna 1102 is described below as being incorporated within a hub type wireless communication network 1100 and within the RF ID tag system, it should be understood that many other types of networks can incorporate the array antenna 1102 to be incorporated into the RF ID tag system. For instance, the array antenna 1102 can be incorporated within a mesh type wireless communication network, a 24-42 GHz point-to-point microwave network, 24-42 GHz point-to-multipoint microwave network or a 2.1-2.7 GHz multipoint distribution system. Accordingly, the array antenna 1102 of the present invention should not be construed in a limited manner.

Referring to FIG. 11, there is a block diagram of a hub type wireless communications network 1100 that utilizes the array antenna 1102 of the present invention. The hub type wireless communications network 1100 includes a hub node 1104 and one or more remote nodes 1106 (four shown). The remote nodes 1106 of the present invention may represent tags as described above.

The hub node 1104 incorporates the electronically steerable passive array antenna 1102 that produces one or more steerable radiation beams 1110 and 1112 which are used to establish communications links with particular remote nodes 1106 (such as tags). A network controller 1114 directs the hub node 1104 and in particular the array antenna 1102 to establish a communications link with a desired remote node 1106 by outputting a steerable beam having a maximum radiation beam pointed in the direction of the desired remote node 1106 and a minimum radiation beam (null) pointed away from that remote node 1106. The network controller 1114 may obtain its adaptive beam steering commands from a variety of sources like the combined use of an initial calibration algorithm and a wide beam which is used to detect new remote nodes 1106 and moving remote nodes 1106. The wide beam enables all new or moved remote nodes 1106 to be updated in its algorithm. The algorithm then can determine the positions of the remote nodes 1106 and calculate the appropriate DC voltage for each of the voltage-tunable capacitors 1206 (described below) in the array antenna 1102.

A more detailed discussion about one way the network controller 1114 can keep up-to-date with its current communication links is provided in a co-owned U.S. patent application Ser. No. 09/620,776 entitled "Dynamically Reconfigurable Wireless Networks (DRWiN) and Methods for Operating such Networks". The contents of this patent application are incorporated by reference herein.

It should be appreciated that the hub node 1104 can also be connected to a backbone communications system 1108 (e.g., Internet, private networks, public switched telephone network, wide area network). It should also be appreciated that the remote nodes 1106 can incorporate an electronically steerable passive array antenna 1102.

Figure 12:
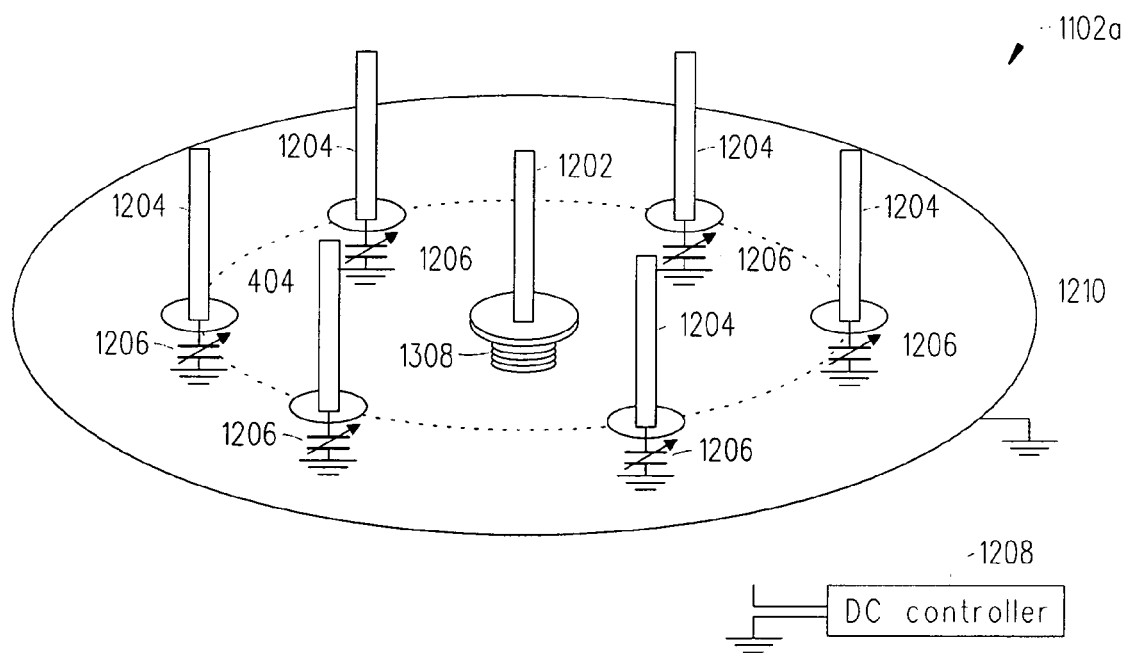
FIG. 12 is a perspective view that illustrates the basic components of a first embodiment of the array antenna shown in FIG. 11.

Referring to FIG. 12, there is a perspective view that illustrates the basic components of a first embodiment of the array antenna 1102a. The array antenna 1102a includes a radiating antenna element 1202 capable of transmitting and receiving radio signals and one or more parasitic antenna elements 1204 that are incapable of transmitting or receiving radio signals. Each parasitic antenna element 1204 (six shown) is located a predetermined distance away from the radiating antenna element 1202. A voltage-tunable capacitor 1206 (six shown) is connected to each parasitic antenna element 1204. A controller 1208 is used to apply a predetermined DC voltage to each one of the voltage-tunable capacitors 1206 in order to change the capacitance of each voltage-tunable capacitor 1206 and thus enable one to control the directions of the maximum radiation beams and the minimum radiation beams (nulls) of a radio signal emitted from the array antenna 1102. The controller 1208 may be part of or interface with the network controller 1114 (see FIG. 11).

In the particular embodiment shown in FIG. 12, the array antenna 1102a includes one radiating antenna element 1202 and six parasitic antenna elements 1204 all of which are configured as monopole elements. The antenna elements 1202 and 1204 are electrically insulated from a grounding plate 1210. The grounding plate 1210 has an area large enough to accommodate all of the antenna elements 1202 and 1204. In the preferred embodiment, each parasitic antenna element 1204 is arranged on a circumference of a predetermined circle around the radiating antenna element 1202. For example, the radiating antenna element 1202 and the parasitic antenna elements 1204 can be separated from one another by about $0.2\lambda 0$-$0.5\lambda 0$ where $\lambda 0$ is the working free space wavelength of the radio signal.

Figure 13:
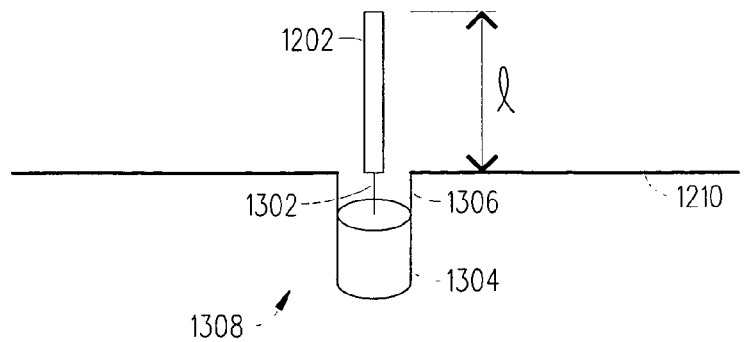
FIG. 13 is a side view of a RF feed antenna element located in the array antenna shown in FIG. 12.

Referring to FIG. 13, there is a side view of the RF feed antenna element 1202. In this embodiment, the feeding antenna element 1202 comprises a cylindrical element that is electrically insulated from the grounding plate 1210. The feeding antenna element 1202 typically has a length of $0.2\lambda 0$-$0.3\lambda 0$ where $\lambda 0$ is the working free space wavelength of the radio signal. As shown, a central conductor 1302 of a coaxial cable 1304 that transmits a radio signal fed from a radio apparatus (not shown) is connected to one end of the radiating antenna element 1202. And, an outer conductor 1306 of the coaxial cable 1304 is connected to the grounding plate 1210. The elements 1302, 1304 and 1306 collectively are referred to as an RF input 1308 (see FIG. 12). Thus, the radio apparatus (not shown) feeds a radio signal to the feeding antenna element 1202 through the coaxial cable 1304, and then, the radio signal is radiated by the feeding antenna element 1202.

Figure 14:
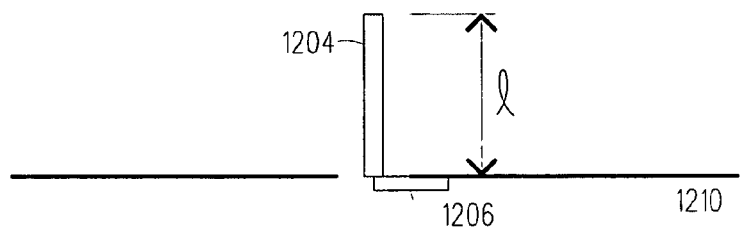
FIG. 14 is a side view of a parasitic antenna element and a voltage-tunable capacitor located in the array antenna shown in FIG. 12.

Referring to FIG. 14, there is a side view of one parasitic antenna element 1204 and one voltage-tunable capacitor 1206. In this embodiment, each parasitic antenna element 1204 has a similar structure comprising a cylindrical element that is electrically insulated from the grounding plate 1210. The parasitic antenna elements 1204 typically have the same length as the radiating antenna element 1202. The voltage-tunable capacitor 1206 is supplied a DC voltage as shown in FIG. 12 which causes a change in the capacitance of the voltage-tunable capacitor 1206 and thus enables one to the control of the directions of the maximum radiation beams and the minimum radiation beams (nulls) of a radio signal emitted from the array antenna 1102. A more detailed discussion about the components and advantages of the voltage-tunable capacitor 1206 are provided below with respect to FIGS. 15A and 15B.

Figures 15A, 15B:
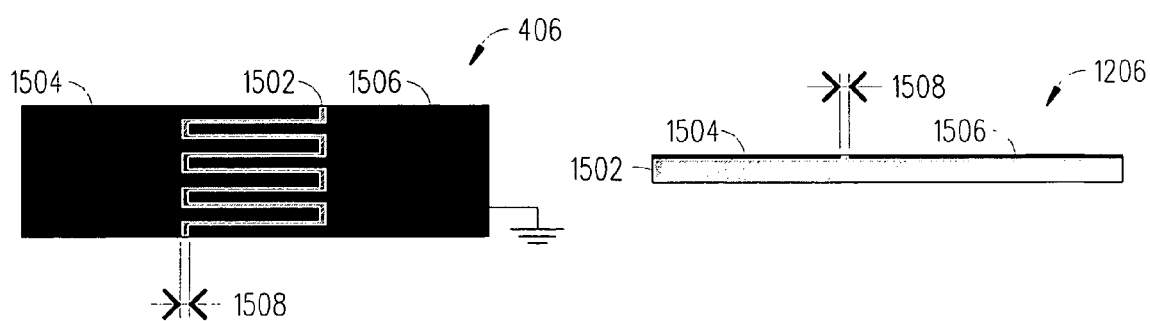
FIGS. 15A and 15B respectively show a top view and a cross-sectional side view of the voltage-tunable capacitor shown in FIG. 14.

Referring to FIGS. 15A and 15B, there are respectively shown a top view and a cross-sectional side view of an exemplary voltage-tunable capacitor 1206. The voltage-tunable capacitor 1206 includes a tunable ferroelectric layer 1502 and a pair of metal electrodes 1504 and 1506 positioned on top of the ferroelectric layer 1502. As shown in FIG. 14, one metal electrode 1504 is attached to one end of the parasitic antenna element 1204. And, the other metal electrode 1504 is attached to the grounding plate 1210. The controller 1208 applies the DC voltage to both of the metal electrodes 1504 and 1506 (see FIG. 12). A substrate (not shown) may be positioned on the bottom of the ferroelectric layer 1502. The substrate may be any type of material that has a relatively low permittivity (e.g., less than about 30) such as MgO, Alumina, $LaAlO_3$, Sapphire, or ceramic.

The tunable ferroelectric layer 1502 is a material that has a permittivity in a range from about 20 to about 2000, and has a tunability in the range from about 10% to about 80% at a bias voltage of about 10 V/μm. In the preferred embodiment this layer is preferably comprised of Barium-Strontium Titanate, $Ba_xSr_{1-x}TiO_3$ (BSTO), where x can range from zero to one, or BSTO-composite ceramics. Examples of such BSTO composites include, but are not limited to: BSTO—MgO, BSTO—$MgAl_2O_4$, BSTO—$CaTiO_3$, BSTO—$MgTiO_3$, BSTO—$MgSrZrTiO_6$, and combinations thereof. The tunable ferroelectric layer 1502 in one preferred embodiment has a dielectric permittivity greater than 100 when subjected to typical DC bias voltages, for example, voltages ranging from about 5 volts to about 300 volts. And, the thickness of the ferroelectric layer can range from about 0.1 μm to about 20 μm. Following is a list of some of the patents which discuss different aspects and capabilities of the tunable ferroelectric layer 1502 all of which are incorporated herein by reference: U.S. Pat. Nos. 5,312,790; 5,427,988; 5,486,491; 5,635,434; 5,830,591; 5,846,893; 5,766,697; 5,693,429 and 5,635,433.

The voltage-tunable capacitor 1206 has a gap 1508 formed between the electrodes 1504 and 1506. The width of the gap 1508 is optimized to increase ratio of the maximum capacitance $C_{max}$ to the minimum capacitance $C_{min}$ ($C_{max}/C_{min}$)

and to increase the quality factor (Q) of the device. The width of the gap 1508 has a strong influence on the Cmax/Cmin parameters of the voltage-tunable capacitor 1206. The optimal width, g, is typically the width at which the voltage-tunable capacitor 1206 has a maximum Cmax/Cmin and minimal loss tangent. In some applications, the voltage-tunable capacitor 1206 may have a gap 1508 in the range of 5-50 µm.

The thickness of the tunable ferroelectric layer 1502 also has a strong influence on the Cmax/Cmin parameters of the voltage-tunable capacitor 1206. The desired thickness of the ferroelectric layer 1502 is typically the thickness at which the voltage-tunable capacitor 1206 has a maximum Cmax/Cmin and minimal loss tangent. For example, an antenna array 1102a operating at frequencies ranging from about 1.0 GHz to about 10 GHz, the loss tangent would range from about 0.0001 to about 0.001. For an antenna array 1102a operating at frequencies ranging from about 10 GHz to about 20 GHz, the loss tangent would range from about 0.001 to about 0.01. And, for an antenna array 1102a operating frequencies ranging from about 20 GHz to about 30 GHz, the loss tangent would range from about 0.005 to about 0.02.

The length of the gap 1508 is another dimension that strongly influences the design and functionality of the voltage-tunable capacitor 1206. In other words, variations in the length of the gap 1508 have a strong effect on the capacitance of the voltage-tunable capacitor 1206. For a desired capacitance, the length can be determined experimentally, or through computer simulation.

The electrodes 1504 and 1506 may be fabricated in any geometry or shape containing a gap 1508 of predetermined width and length. In the preferred embodiment, the electrode material is gold which is resistant to corrosion. However, other conductors such as copper, silver or aluminum, may also be used. Copper provides high conductivity, and would typically be coated with gold for bonding or nickel for soldering.

Figure 16A:
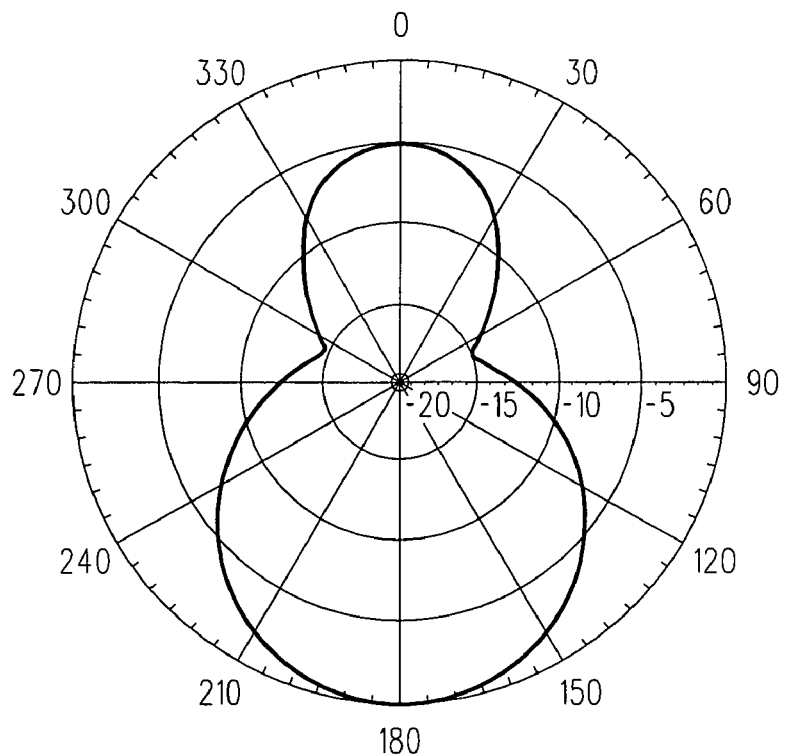
FIGS. 16A and 16B respectively show simulation patterns in a horizontal plane and in a vertical plane that were obtained to indicate the performance of an exemplary array antenna configured like the array antenna shown in FIG. 12 and used in the RF ID tag system of the present invention.
Figure 16B:
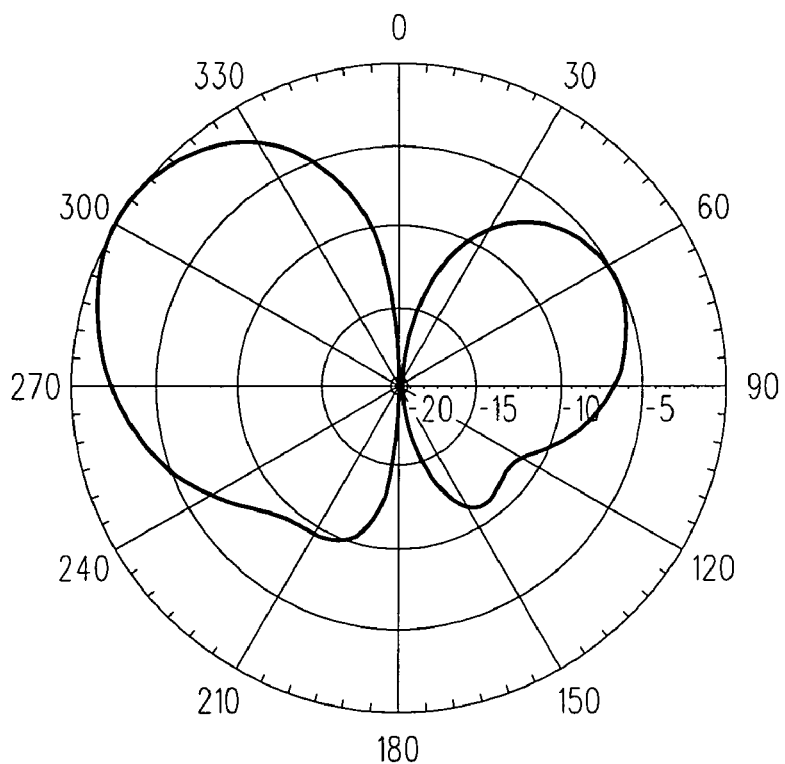

Referring to FIGS. 16A and 16B, there are respectively shown two simulation patterns one in a horizontal plane and the other in a vertical plane that where obtained to indicate the performance of an exemplary array antenna 1102. The exemplary array antenna 1102 has a configuration similar to the array antenna 1102a shown in FIG. 12 where each parasitic antenna element 1204 is arranged on a circumference of a predetermined circle around the radiating antenna element 1202. In this simulation, the radiating antenna element 1202 and the parasitic antenna elements 1204 were separated from one another by 0.25λ0.

Referring again to FIG. 12, the antenna array 1102a operates by exciting the radiating antenna element 1202 with the radio frequency energy of a radio signal. Thereafter, the radio frequency energy of the radio signal emitted from the radiating antenna element 1202 is received by the parasitic antenna elements 1204 which then re-radiate the radio frequency energy after it has been reflected and phase changed by the voltage-tunable capacitors 1206. The controller 1208 changes the phase of the radio frequency energy at each parasitic antenna element 1204 by applying a predetermined DC voltage to each voltage-tunable capacitor 1206 which changes the capacitance of each voltage-tunable capacitor 1206. This mutual coupling between the radiating antenna element 1202 and the parasitic antenna elements 1204 enables one to steer the radiation beams and nulls of the radio signal that is emitted from the antenna array 1102a.

Figure 17:
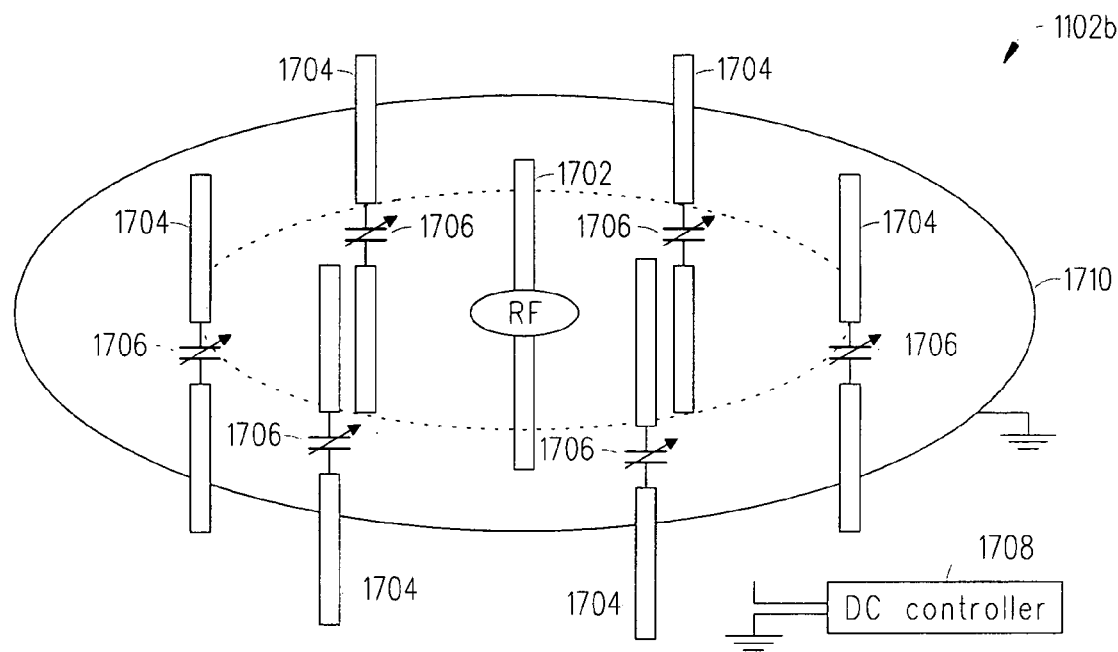
FIG. 17 is a perspective view that illustrates the basic components of a second embodiment of the array antenna shown in FIG. 11.

Referring to FIG. 17, there is a perspective view that illustrates the basic components of a second embodiment of the array antenna 1102b. The array antenna 1102b has a similar structure and functionality to array antenna 1102a except that the antenna elements 1702 and 1704 are configured as dipole elements instead of a monopole elements as shown in FIG. 12. The array antenna 1102b includes a radiating antenna element 1702 capable of transmitting and receiving radio signals and one or more parasitic antenna elements 1704 that are incapable of transmitting or receiving radio signals. Each parasitic antenna element 1704 (six shown) is located a predetermined distance away from the radiating antenna element 1702. A voltage-tunable capacitor 1706 (six shown) is connected to each parasitic element 1704. A controller 1708 is used to apply a predetermined DC voltage to each one of the voltage-tunable capacitors 1706 in order to change the capacitance of each voltage-tunable capacitor 1706 and thus enable one to control the directions of the maximum radiation beams and the minimum radiation beams (nulls) of a radio signal emitted from the array antenna 1102b. The controller 1708 may be part of or interface with the network controller 1114 (see FIG. 11).

In the particular embodiment shown in FIG. 17, the array antenna 1102b includes one radiating antenna element 1702 and six parasitic antenna elements 1704 all of which are configured as dipole elements. The antenna elements 1702 and 1704 are electrically insulated from a grounding plate 1710. The grounding plate 1710 has an area large enough to accommodate all of the antenna elements 1702 and 1704. In the preferred embodiment, each parasitic antenna element 1704 is located on a circumference of a predetermined circle around the radiating antenna element 1702. For example, the radiating antenna element 1702 and the parasitic antenna elements 1704 can be separated from one another by about 0.2λ0-0.5λ0 where λ0 is the working free space wavelength of the radio signal.

Figure 18:
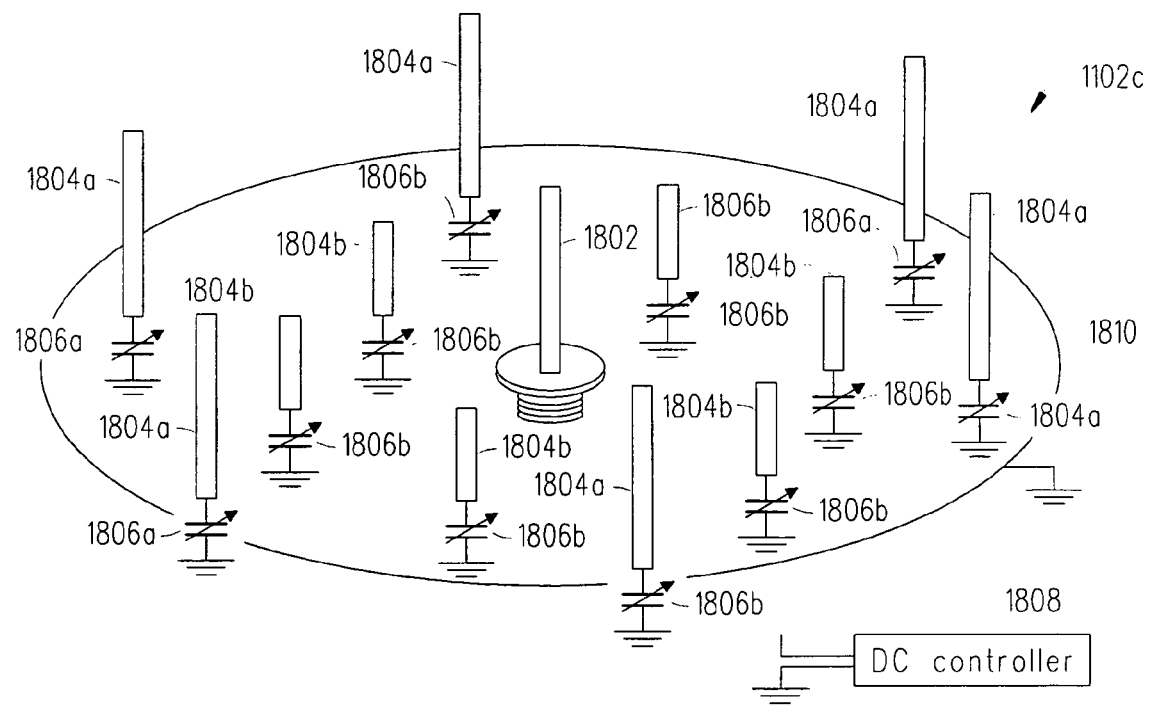
FIG. 18 is a perspective view that illustrates the basic components of a third embodiment of the array antenna shown in FIG. 11.

Referring to FIG. 18, there is a perspective view that illustrates the basic components of a third embodiment of the array antenna 1102c. The array antenna 1102c includes a radiating antenna element 1002 capable of transmitting and receiving dual band radio signals. The array antenna 1102c also includes one or more low frequency parasitic antenna elements 1804a (six shown) and one or more high frequency parasitic antenna elements 1804b (six shown). The parasitic antenna elements 1804a and 1804b are incapable of transmitting or receiving radio signals. Each of the parasitic antenna elements 1804a and 1804b are locate a predetermined distance away from the radiating antenna element 1802. As shown, the low frequency parasitic antenna elements 1804a are located on a circumference of a "large" circle around both the radiating antenna element 1802 and the high frequency parasitic antenna elements 1804b. And, the high frequency parasitic antenna elements 1804b are located on a circumference of a "small" circle around the radiating antenna element 1802. In this embodiment, the low frequency parasitic antenna elements 1804a are the same height as the radiating antenna element 1802. And, the high frequency parasitic antenna elements 1804b are shorter than the low frequency parasitic antenna elements 1804a and the radiating antenna element 1802.

The array antenna 1102c also includes one or more low frequency voltage-tunable capacitors 1806a (six shown) which are connected to each of the low frequency parasitic elements 1804a. In addition, the array antenna 1102c includes one or more high frequency voltage-tunable capacitors 1806b (six shown) which are connected to each of the high frequency parasitic elements 1804b. A controller 1008 is used to apply a predetermined DC voltage to each one of the voltage-tunable capacitors 1806a and 1806b in order to change the capacitance of each voltage-tunable capacitor

1806a and 1806b and thus enable one to control the directions of the maximum radiation beams and the minimum radiation beams (nulls) of a dual band radio signal that is emitted from the array antenna 1102c. The controller 1808 may be part of or interface with the network controller 1114 (see FIG. 11).

In the particular embodiment shown in FIG. 18, the array antenna 1102c includes one radiating antenna element 1802 and twelve parasitic antenna elements 1804a and 1804b all of which are configured as monopole elements. The antenna elements 1802, 1804a and 1804b are electrically insulated from a grounding plate 1810. The grounding plate 1810 has an area large enough to accommodate all of the antenna elements 1802, 1804a and 1804b. It should be understood that the low frequency parasitic antenna elements 1804a do not affect the high frequency parasitic antenna elements 1804b and vice versa.

The antenna array 1102c operates by exciting the radiating antenna element 1802 with the high and low radio frequency energy of a dual band radio signal. Thereafter, the low frequency radio energy of the dual band radio signal emitted from the radiating antenna element 1802 is received by the low frequency parasitic antenna elements 1804a which then re-radiate the low frequency radio frequency energy after it has been reflected and phase changed by the low frequency voltage-tunable capacitors 1806a. Likewise, the high frequency radio energy of the dual band radio signal emitted from the radiating antenna element 1802 is received by the high frequency parasitic antenna elements 1804b which then re-radiate the high frequency radio frequency energy after it has been reflected and phase changed by the high frequency voltage-tunable capacitors 1806b. The controller 1808 changes the phase of the radio frequency energy at each parasitic antenna element 1804a and 1804b by applying a predetermined DC voltage to each voltage-tunable capacitor 1806a and 1806b which changes the capacitance of each voltage-tunable capacitor 1806a and 1806b. This mutual coupling between the radiating antenna element 1802 and the parasitic antenna elements 1804a and 1804b enables one to steer the radiation beams and nulls of the dual band radio signal that is emitted from the antenna array 1102c. The array antenna 1102c configured as described above can be called a dual band, endfire, phased array antenna 1102c.

Although the array antennas described above have radiating antenna elements and parasitic antenna elements that are configured as either a monopole element or dipole element, it should be understood that these antenna elements can have different configurations. For instance, these antenna elements can be a planar microstrip antenna, a patch antenna, a ring antenna or a helix antenna.

In the above description, it should be understood that the features of the array antennas apply whether it is used for transmitting or receiving. For a passive array antenna the properties are the same for both the receive and transmit modes. Therefore, no confusion should result from a description that is made in terms of one or the other mode of operation and it is well understood by those skilled in the art that the invention is not limited to one or the other mode.

Following are some of the different advantages and features of the array antenna 1102 of the present invention:

The array antenna 1102 has a simple configuration.
The array antenna 1102 is relatively inexpensive.
The array antenna 1102 has a high RF power handling parameter of up to 20 W. In contrast, the traditional array antenna 200 has a RF power handling parameter that is less than 1 W.
The array antenna 1102 has a low linearity distortion represented by IP3 of up to +65 dBm. In contrast, the traditional array antenna 200 has a linearity distortion represented by IP3 of about +30 dBm.

The array antenna 1102 has a low voltage-tunable capacitor loss.

The dual band array antenna 1102c has two bands each of which works up to 20% of frequency. In particular, there are two center frequency points for the dual band antenna f0 each of which has a bandwidth of about 10%~20% [(f1+f2)/2=f0, Bandwidth=(f2−f1)/f0*100%] where f1 and f2 are the start and end frequency points for one frequency band. Whereas the single band antenna 1102a and 302b works in the f1, to f2 frequency range. The dual band antenna 1102c works in one f1 to f2 frequency range and another f1 to f2 frequency range. The two center frequency points are apart from each other, such as more than 10%. For example, 1.6 GHz~1.7 GHz and 2.4 GHz~2.5 GHz, etc. The traditional array antenna 200 cannot support a dual band radio signal.

Figure 19:
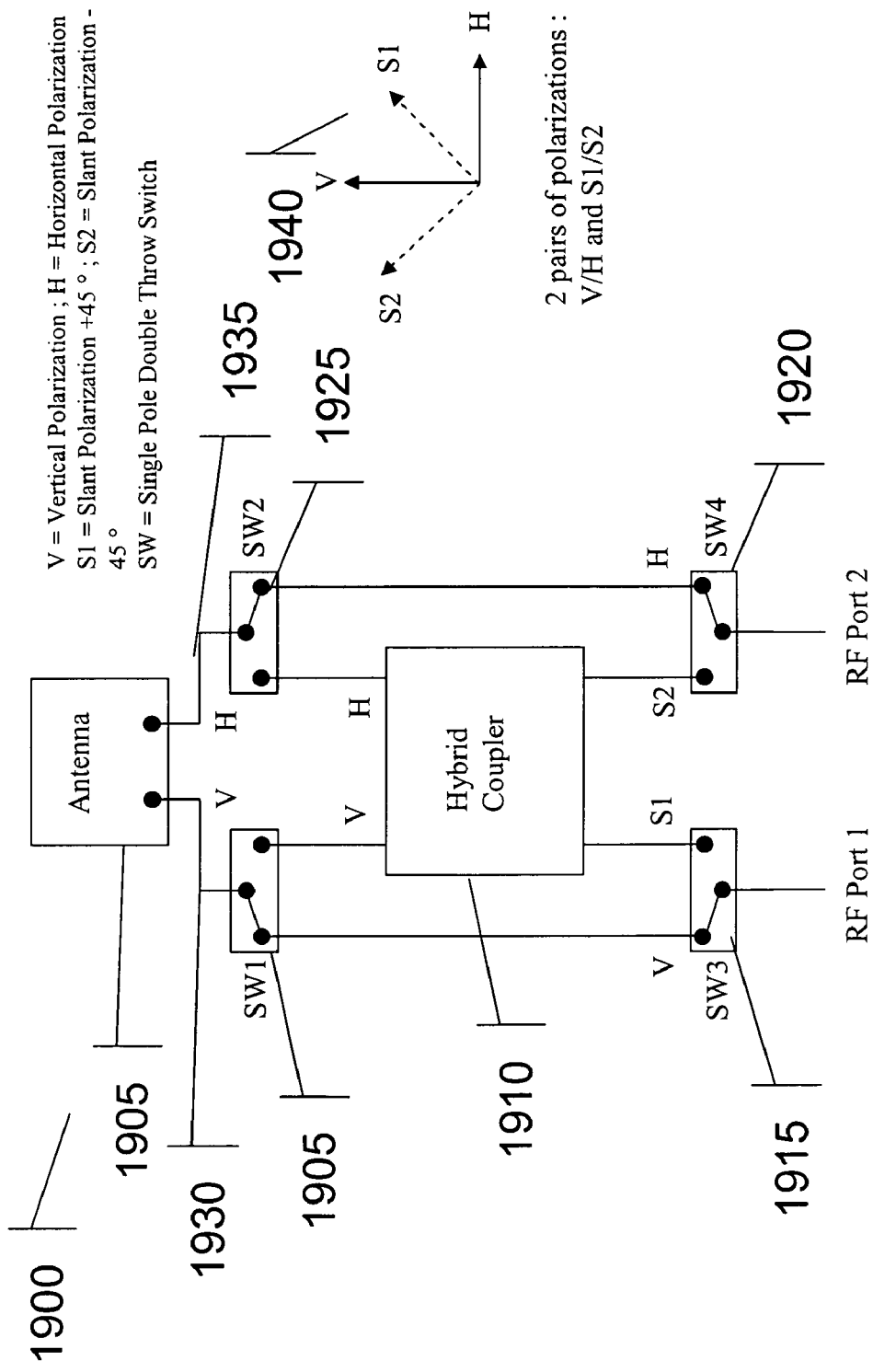
FIG. 19 is a block diagram of the switched polarization antenna that can be used in the RF ID tag system of the present invention.

As mentioned above and described in more detail below, the antennas of the present invention can have switchable polarizations to improve performance. As shown in FIG. 19 generally as 1900, the antenna 1905 provides two RF signals 1930 and 1935, one with Vertical polarization 1930 and one with Horizontal polarization 1935. Each RF signal will then pass through a single pole double throw switch. Vertically polarized signal 1930 will pass through single pole double throw switch SW1, 1905, and horizontally polarized signal 1935 will pass through single pole double throw switch SW2, 1925.

For both single pole double throw switches SW1, 1905, and SW2, 1925, one position of the switches outputs the signal unchanged, i.e., with the same polarization, and the other position will pass the signal through the hybrid coupler 1910. The function of hybrid coupler 1910 is to convert vertical/horizontal polarizations into two slant polarizations at +45° and −45° as shown at 1940.

Switches SW3, 1915, and SW4, 1920, select the desired set of polarizations, namely Vertical/Horizontal or +45° and −45° slant. This polarization diversity provided by antenna 1905 will greatly enhance the performance of the present RFID system, especially in presence of multi-path fading.

Not meant to be exhaustive or exclusive, the following table shows some of the specific different frequency bands used in this embodiment of the present invention.

| Frequency band | Applications |
| --- | --- |
| 868-870 MHz. | SRD (Short Range Devices, RFID) in CEPT countries Most devices use 869 MHz for RFID up to 500 mW |
| 902-928 MHz | ISM and RFID applications in Region 2 covers North America, most devices use 915 MHz for RFID 4W in North America/Canada |
| 918-926 MHz | RFID in Australia. Most devices use 923 MHz |
| 950-956 MHz | RFID in Japan, just allocated |

With any of the aforementioned embodiments, because of the unique capabilities of the RF ID tag readers and RF ID tags with the novel scanning, stearable and array antennas provided herein, position information can be readily obtained. This is accomplished with the present invention by associating at least one RF ID tag with anything where position information or tracking information is desired from, such as any object, person or thing. Then communication is established between at least one RF ID tag reader and said at least one RF ID tag. In a first embodiment, at least one RF ID tag reader includes at least two electronically steerable scanning antennas.

At this point one can determine the location of said at least one RF ID tag relative to said at least one RF ID tag reader by triangulating the angular information between said at least one RF ID tag and said at least two electronically steerable scanning antennas associated with said at least one RF ID tag reader.

Improved accuracy of the position information can be obtained by determining the signal strength of the communication between said at least one RF ID tag and said at least one RF ID tag reader. Also, improved accuracy is provided by determining the time of flight of RF signals between said at least one RF ID tag and said at least one RF ID tag reader to improve accuracy of said position information.

In a second embodiment multiple RF tag readers are used instead of multiple antennas with at least one RF ID tag reader. Hence, the position of an object, person or thing, is determined by associating at least one RF ID tag with said object, person or thing and establishing communication between at least two RF ID tag readers and said at least one RF ID tag, said at least two RF ID tag readers including at least one electronically steerable scanning antenna. Then the location of said at least one RF ID tag relative to said at least two RF ID tag readers is determined by triangulating the angular information between said at least one RF ID tag and said at least two RF ID tag reader using said at least one electronically steerable scanning antennas.

As above, the accuracy can be improved by determining the signal strength of the communication between said at least one RF ID tag and said at least two RF ID tag readers and/or by determining the time of flight of RF signals between said at least one RF ID tag and said at least two RF ID tag readers to improve accuracy of said position information.

The aforementioned method of determining the position of an object, person or thing is accomplished by the following system, wherein at least one RF ID tag is associated with said object, person or thing and at least one RF ID tag reader establishes communication with said at least one RF ID tag. The at least one RF ID tag reader includes at least two electronically steerable scanning antennas and determines the relative location of said at least one RF ID tag by triangulating the angular information between said at least one RF ID tag and said at least two electronically steerable scanning antennas which are associated with said at least one RF ID tag reader.

Again, the accuracy can be improved by including in the system a means for determining the signal strength of the communication between said at least one RF ID tag and said at least one RF ID tag reader. There are a number of methods known to enable this signal strength determination and well known to those of ordinary skill in the art and thus is not elaborated on herein.

Further, the accuracy can be improved by providing a means for determining the time of flight of RF signals between said at least one RF ID tag and said at least one RF ID tag reader.

The system can include multiple antennas with at least one RF ID card reader as above or can include multiple RF ID tag readers associated with at least one electronically steerable scanning antenna as set forth below, wherein the object, person or thing position determination system comprises at least one RF ID tag associated with said object, person or thing and in the embodiment at least two RF ID tag readers which establish communication with said at least one RF ID tag. The at least two RF ID tag readers include at least one electronically steerable scanning antenna.

The at least two RF ID tag readers determine the relative location of said at least one RF ID tag by triangulating the angular information between said at least one RF ID tag and said at least one electronically steerable scanning antennas associated with said at least two RF ID tag readers.

With the at least two RF ID tag reader embodiment, accuracy can be improved by providing a means for determining the signal strength of the communication between said at least one RF ID tag and said at least two RF ID tag readers to improve accuracy of said position information. It can be further improved by providing a means for determining the time of flight of RF signals between said at least one RF ID tag and said at least two RF ID tag readers to improve accuracy of said position information.

While the present invention has been described in terms of what are at present believed to be its preferred embodiments, those skilled in the art will recognize that various modifications to the disclose embodiments can be made without departing from the scope of the invention as defined by the following claims. Further, although a specific scanning antenna utilizing dielectric material is being described in the preferred embodiment, it is understood that any scanning antenna can be used with any type of reader any type of tag and not fall outside of the scope of the present invention.

What is claimed is:

1. An RF ID card reader, comprising:
   RF ID circuitry to generate an RF ID signal;
   a transceiver in communication with said RF ID circuitry; and
   a scanning antenna associated with said transceiver for scanning an area for at least one tag and establishing communication with at least one tag;
   wherein said scanning antenna comprises:
   at least one RF module, said at least one RF module further comprising at least one RF connection for receipt of at least one RF signal and at least one tunable or switchable device;
   a RF motherboard for acceptance of RF signals and distribution of transmit energy to said RF module at appropriate phases to generate a beam in a commanded direction and width; and
   a controller for determining a correct signal to send to said at least one RF module.

2. The RF ID card reader of claim 1, wherein said at least one RF signal has either single or dual polarization which can be either linear or circular.

3. The RF ID card reader of claim 1, wherein said at least one RF module is nine RF modules.

4. The RF ID card reader of claim 1, wherein an interface connects said scanning antenna with a microcontroller associated with said reader.

5. The RF ID card reader of claim 1, wherein a beam width and steer have at least a 6 dBi gain throughout a 360 degree azimuth scan or any segmentation of 360 degrees.

6. The RF ID card reader of claim 1, further comprising a Radome surrounding said at least one RF module and said RF mother board.

7. The RF ID card reader of claim 6, further comprising a base attached to said radome, said base provides openings for reception of an RF connector, power supply and data input.

8. The RF ID card reader of claim 1, wherein said scanning antenna operation is in any one, all or part of the following frequencies: the 2.4 GHz band; the 5.1 to 5.8 GHz band; the 860-960MHz band; or the 433 MHz band.

9. The RF ID card reader of claim 1, further comprising a software driver to control a scanning antenna azimuth scan angle to maximize a received wireless signal.

10. The RF ID card reader of claim 1, further comprising a three way divider, the output of said three way divider connects to a phase shifter module.

11. An RF ID tag system, comprising:
   at least one RF ID tag;
   at least one RF ID tag reader, said at least one tag reader including at least one RF ID tag reader microcontroller; and
   at least one transceiver associated with said at least one microcontroller, said at least one transceiver in communication with at least one scanning antenna for transmitting signals to and receiving signals from said at least one tag;
   wherein said at least one scanning antenna comprises:
   at least one RF module, said at least one RF module further comprising at least one RF connection for receipt of at least one RF signal and at least on tunable or switchable device;
   an RF motherboard for acceptance of RF signals and distribution of transmit energy to said RF module at appropriate phases to generate a beam in a commanded direction and width; and
   a controller for determining a correct signal to send to said at least one RF module.

12. The RF ID tag reader of claim 11, wherein said at least one RF signal has either single or dual polarization which can be either linear or circular.

13. The RF ID tag reader of claim 11, wherein said at least one RF module is nine RF modules.

14. The RF ID tag reader of claim 11, wherein an interface connects said scanning antenna with a microcontroller associated with said reader.

15. The RF ID tag reader of claim 11, wherein a beam width and steer have at least a 6 dBi gain throughout a 360 degree azimuth scan or any segmentation of 360 with at least 6 dBi gain.

16. The RF ID tag reader of claim 11, further comprising a Radome surrounding said at least one RF module and said RF mother board.

17. The RF ID tag reader of claim 11, further comprising a base attached to a radome housing said controller, said base provides openings for reception of an RF connector, power supply and data input.

18. The RF ID tag reader of claim 11, wherein said scanning antenna operation is in any one, all or part of the following frequencies: the 2.4 GHz band; the 5.1 to 5.8 GHz band; the 860-960 MHz band; or the 433 MHz band.

19. The RF ID tag reader of claim 11, further comprising a software driver to control a scanning antenna azimuth scan angle to maximize a received wireless signal.

20. The RF ID tag reader of claim 11, further comprising a three way divider, the output of said three way divider connects to a phase shifter module.

21. A method of tracking an object, person or thing, comprising the steps of:
   associating an RF ID tag with said object, person or thing;
   providing an RF ID tag reader with a scanning antenna for transmitting information to, and receiving information from, said RF ID tag, said RF ID tag containing information about said object, person or thing;
   wherein said scanning antenna comprises:
   at least one RF module, said at least one RF module further comprising at least one RF connection for receipt of at least one RF signal and at least one tunable or switchable device;
   an RF motherboard for acceptance of RF signals and distribution of transmit energy to said RF module at appropriate phases to generate a beam in a commanded direction and width; and
   a controller for determining a correct signal to send to said at least one RF module.

22. The method of tracking an object, person or thing of claim 21, wherein said at least one RF signal is at least two RF signal has either single or dual polarization which can be either linear or circular.

23. The method of tracking an object, person or thing of claim 21, wherein said at least one RF module is nine RF modules.

24. The method of tracking an object, person or thing of claim 21, wherein an interface connects said scanning antenna with a microcontroller associated with said reader.

25. The method of tracking an object, person or thing of claim 21, wherein a beam width and steer have at least a 6 dBi gain throughout a 360 degree azimuth scan or any segmentation of 360 degrees with at least 6 dBi gain.

26. The method of tracking an object, person or thing of claim 21, wherein said scanning further comprises a Radome surrounding said at least one RF module and said RF mother board.

27. The method of tracking an object, person or thing of claim 21, wherein said scanning antenna further comprises a base attached to said radome, said base provides openings for reception of an RF connector, power supply and data input.

28. The method of tracking an object, person or thing of claim 21, wherein said scanning antenna operation is in any one, all or part of the following frequencies: the 2.4 GHz band; the 5.1 to 5.8 GHz band; the 860-960 MHz band; or the 433 MHz band.

29. The method of tracking an object, person or thing of claim 21, wherein said scanning antenna further comprises a software driver to control a scanning antenna azimuth scan angle to maximize a received wireless signal.

30. The method of tracking an object, person or thing of claim 21, wherein said scanning antenna further comprises a three way divider, the output of said three way divider connects to a phase shifter module.

* * * * *